United States Patent
Chang et al.

(10) Patent No.: US 6,233,586 B1
(45) Date of Patent: May 15, 2001

(54) FEDERATED SEARCHING OF HETEROGENEOUS DATASTORES USING A FEDERATED QUERY OBJECT

(75) Inventors: Daniel T. Chang, San Jose; Siyi Terry Donn, Saratoga; Douglas Michael Hembry, Los Gatos; Tae Jae Lee, Cupertino; Basuki N. Soetarman, Los Gatos; Robert N. Summers, San Jose; Frank C. Tung, Saratoga, all of CA (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/052,679

(22) Filed: Apr. 1, 1998

(51) Int. Cl.[7] .................................................. G06F 17/30
(52) U.S. Cl. .................................... 707/103; 707/10
(58) Field of Search ........................ 707/3, 1, 10, 103, 707/4

(56) References Cited

U.S. PATENT DOCUMENTS

| | | | |
|---|---|---|---|
| 4,943,932 | 7/1990 | Lark et al. | 706/60 |
| 5,345,586 | 9/1994 | Hamala et al. | 707/10 |
| 5,377,323 | 12/1994 | Vasudevan | 709/226 |
| 5,408,652 | 4/1995 | Hayashi et al. | 707/1 |
| 5,412,806 | 5/1995 | Du et al. | 707/2 |
| 5,416,917 | 5/1995 | Adair et al. | 707/203 |
| 5,442,791 | 8/1995 | Wrabetz et al. | 709/330 |
| 5,594,899 | 1/1997 | Knudsen et al. | 707/2 |
| 5,596,744 * | 1/1997 | Dao et al. | 707/10 |
| 5,603,031 | 2/1997 | White et al. | 709/317 |
| 5,634,010 | 5/1997 | Ciscon et al. | 709/223 |
| 5,634,053 * | 5/1997 | Noble et al. | 707/4 |
| 5,634,127 | 5/1997 | Cloud et al. | 709/113 |
| 5,745,683 | 4/1998 | Lee et al. | 709/250 |
| 5,754,841 * | 5/1998 | Carino, Jr. | 707/3 |
| 5,778,355 | 7/1998 | Boyer et al. | 707/2 |
| 5,859,972 * | 1/1999 | Subramaniam et al. | 707/10 |
| 5,873,083 * | 2/1999 | Jones et al. | 707/4 |
| 5,899,990 * | 5/1999 | Maritzen et al. | 707/4 |
| 5,930,786 * | 7/1999 | Carino, Jr. et al. | 707/4 |
| 6,003,079 | 12/1999 | Friedreich et al. | 709/224 |
| 6,006,214 | 12/1999 | Carey et al. | 707/2 |

OTHER PUBLICATIONS

Kamel et al., The Federated Database Management System: An Architecture of Distributed Systems, IEEE online, pp. 346–352, Sep. 1990.*

Kapsammer et al., The IRO–DB Approach: Processing Queries in Federated Database Systems, IEEE online, pp. 713–718, Sep. 1997.*

Radeke et al., Extending ODMG for Federated Database Systems, IEEE online, pp. 304–312, Sep. 1996.*

(List continued on next page.)

*Primary Examiner*—Jack Choules
*Assistant Examiner*—Greta L. Robinson
(74) *Attorney, Agent, or Firm*—Sughrue, Mion, Zinn, Macpeak & Seas, PLLC

(57) ABSTRACT

A computer method and system capable of searching multiple heterogeneous datastores with heterogeneous data types by employing an object oriented data model to define a federated query object, a federated collection object and a federated datastore object. The federated query object translates a generic query into the appropriate queries for each datastore, the federated datastore object acts as a virtual datastore for multiple heterogeneous datastores with the ability to map concepts between datastores, and the federated collection object represents results from a federated query in a hierarchy that maintains sub-grouping information from each datastore to allow accessing of results by datastore or as a single collection of results. The federated objects thus provide user applications with enhanced accessibility of different hierarchies of information, as well as more robust search capabilities.

34 Claims, 10 Drawing Sheets

OTHER PUBLICATIONS

"Application Programming Guide and Reference for Internet Connection, SC26–8868–00" Version 1, IBM Digital Library—1996.

"Guide to Object–Oriented and Internet Application Programming" Version 2, IBM Digital Library—1996, 1997.

"Application Programming Reference, SC26–8652–02" Version 2, IBM Digital Library—1995, 1997.

JavaOne Presentation: Advanced JavaBeans Components "Glasgow" printed Apr. 22, 1998, presented Mar. 24–27, 1998.

"A Draft Proposal to Define an Extensible Runtime Containment and Services Protocol for JavaBeans (Version 0.98)" Laurence Cable—Jan. 9, 1998.

Qing Li,; and McLeod, D. "An object oriented approach to federated databases", pp. 64–70, Apr. 1991.

Deacon, A. Schek, H.–J.; and Weikum, G., "Semantics based multilevel transaction management in federated systems", pp. 452–461, Feb. 1994.

Vermeer and Apers, Query modification in object–oriented database federation, Cooperative Information Systems, pp. 193–202.

* cited by examiner

FEDERATED SEARCHING OF HETEROGENEOUS DATASTORES USING A FEDERATED QUERY OBJECT

TABLE OF CONTENTS

I. BACKGROUND OF THE INVENTION
II. SUMMARY OF THE INVENTION
III. BRIEF DESCRIPTION OF THE DRAWINGS
IV. DETAILED DESCRIPTION OF PREFERRED EMBODIMENTS
  1. Architecture
  2. Packaging
  3. Class Overview
  4. Class Dynamics
  5. Object Collection Classes
  5.1 Collection
  5.2 Sequential Collection
  5.3 Folder
  5.4 Parts
  5.5 Query Evaluator
  5.6 Queryable Collection
  5.7 Federated Collection
    5.7.1 Methods
  5.8 Results
  5.9 Iterator
  5.10 Sequential Iterator
  5.11 Federated Iterator
    5.11.1 Methods
  6. Object Query Classes
  6.1 Query Manager
  6.2 Query Base
  6.3 Query
  6.4 Parametric Query
  6.5 Text Query
  6.6 Image Query
  6.7 Combined Query
  6.8 On Demand Query
  6.9 Federated Query
  7. Data Object Classes
  7.1 Data Object Base
  7.2 Data Object
  7.3 DDO Base—Dynamic Data Object Base
  7.4 DDO—Dynamic Data Object
  8. XDO Classes
  9. Data Access Classes
  9.1 Datastore
  9.2 Datastore DL
  9.3 Datastore TS
  9.4 Datastore QBIC
  9.5 Datastore OD
  9.6 Datastire Federated
    9.6.1 Methods
    9.6.2 Federated Query String
    9.6.3 Federated Query Processing
  9.7 Result Set Cursor
  10. Schema Mapping
  11. Federated Datastore Mapping Components
  12. Schema Mapping Classes
  13. Persistency Support
  14. Supporting Classes
  12. Sample Programs
  12.1 Queryable Collection DL
  12.2 Combined Query in DL
  12.3 Folder Processing in DL
  12.4 Example of Add, Retrieve, Update, Delete and Open from XDO Object

BACKGROUND OF THE INVENTION

The present invention relates to a system and method for representing and searching multiple heterogeneous datastores (datastore is a term used to refer to a generic data storage facility, such as a relational data base, flat-file, hierarchical data base, etc.) and managing the results of such searches.

For nearly half a century computers have been used by businesses to manage information such as numbers and text, mainly in the form of coded data. However, business data represents only a small part of the world's information. As storage, communication and information processing technologies advance, and as their costs come down, it becomes more feasible to digitize other various types of data, store large volumes of it, and be able to distribute it on demand to users at their place of business or home.

New digitization technologies have emerged in the last decade to digitize images, audio, and video, giving birth to a new type of digital multimedia information. These multimedia objects are quite different from the business data that computers managed in the past, and often require more advanced information management system infrastructures with new capabilities. Such systems are often called "digital libraries."

Bringing new digital technologies can do much more than just replace physical objects with their electronic representation. It enables instant access to information; supports fast, accurate, and powerful search mechanisms; provides, new "experiential" (i.e. virtual reality) user interfaces; and implements new ways of protecting the rights of information owners. These properties make digital library solutions even more attractive and acceptable not only to corporate IS organizations, but to the information owners, publishers and service providers.

Creating and Capturing Data

Generally, business data is created by a business process (an airline ticket reservation, a deposit at the bank, and a claim processing at an insurance company are examples). Most of these processes have been automated by computers and produce business data in digital form (text and numbers). Therefore it is usually structured coded data. Multimedia data, on the contrary, cannot be fully pre-structured (its use is not fully predictable) because it is the result of the creation of a human being or the digitization of an object of the real world (x-rays, geophysical mapping, etc.) rather than a computer algorithm.

The average size of business data in digital form is relatively small. A banking record—including a customers name, address, phone number, account number, balance, etc.—represents at most a few hundred characters, i.e. few hundreds/thousands of bits. The digitization of multimedia information (image, audio, video) produces a large set of bits called an "object" or "blobs" (Binary Large Objects). For example, a digitized image of the parchments from the Vatican Library takes as much as the equivalent of 30 million characters (30 MB) to be stored. The digitization of a movie, even after compression, may take as much as the equivalent of several billions of characters (3–4 GB) to be stored.

Multimedia information is typically stored as much larger objects, ever increasing in quantity and therefore requiring special storage mechanisms. Classical business computer systems have not been designed to directly store such large objects. Specialized storage technologies may be required for certain types of information, e.g. media streamers for video or music. Because certain multimedia information needs to be preserved "forever" it also requires special storage management functions providing automated back-up and migration to new storage technologies as they become available and as old technologies become obsolete.

Finally, for performance reasons, the multimedia data is often placed in the proximity of the users with the system supporting multiple distributed object servers. This often requires a logical separation between applications, indices, and data to ensure independence from any changes in the location of the data.

Searching and Accessing Data

The indexing of business data is often imbedded into the data itself. When the automated business process stores a person's name in the column "NAME," it actually indexes that information. Multimedia information objects usually do not contain indexing information. This "meta data" needs to be created in addition by developers or librarians. The indexing information for multimedia information is often kept in "business like" databases separated from the physical object.

In a Digital Library (DL), the multimedia object can be linked with the associated indexing information, since both are available in digital form. Integration of this legacy catalog information with the digitized object is crucial and is one of the great advantages of DL technology. Different types of objects can be categorized differently as appropriate for each object type. Existing standards like MARC records for libraries, Finding Aids for archiving of special collections, etc . . . can be used when appropriate.

The indexing information used for catalog searches in physical libraries is mostly what one can read on the covers of the books: authors name, title, publisher, ISBN, . . . enriched by other information created by librarians based on the content of the books (abstracts, subjects, keywords, . . . ). In digital libraries, the entire content of books, images, music, films, etc. are available and "new content" technologies are needed; technologies for full text searching, image content searching (searching based on color, texture, shape, etc . . . ), video content searching, and audio content searching. The integrated combination of catalog searches (e.g. SQL) with content searches will provide more powerful search and access functions. These technologies can also be used to partially automate further indexing, classification, and abstracting of objects based on content.

To harness the massive amounts of information spread throughout these networks, it has become necessary for a user to search numerous storage facilities at the same time without having to consider the particular implementation of each storage facility. Many approaches have been made to provide effective tools for performing "federated" searches of multiple heterogeneous storage facilities, each having diverse data types, and for managing the results of these searches. A comprehensive survey on the federation of heterogeneous database systems can be found in Sheth, A. P. and Larson, J. A., *"Federated Database Systems for Managing Distributed, Heterogeneous, and Autonomous Databases,"* ACM Computing Surveys, vol. 22, No. Sep. 3, 1990, pp. 183–236.

Some particular approaches include, for example, U.S. Pat. Nos. 5,596,744 (Dao et al.), and 5,634,053 (Noble et al.) which disclose Federated Information Management (FIM) architectures for providing users with transparent access to heterogeneous database systems with multimedia information. However, these architectures rely on complex application software for translation and interaction between various entities in the system.

Object-oriented approaches are generally better suited for such complex data management. The term "object-oriented" refers to a software design method which uses "classes" and "objects" to model abstract or real objects. An "object" is the main building block of object-oriented programming, and is a programming unit which has both data and functionality (i.e., "methods"). A "class" defines the implementation of a particular kind of object, the variables and methods it uses, and the parent class it belongs to.

An example of a known object-oriented approach to managing heterogeneous data from heterogeneous data bases is found in U.S. Pat. No. 5,557,785 (Lacquit et al.). Lacquit provides for the searching of multiple heterogeneous data managers, such as Global Information Service (GIS), Relational DataBase Management Service (RDBMS), and Visual Data (VD). This approach utilizes a first object-oriented class which describes properties common to all objects manipulated by the information system. A second class defines the properties relative to the use of functions of the various data managers. Lacquit also models particular databases as specific instantiations of a generic data manager class, to enhance their accessibility. However, the Lacquit approach does not provide a federated datastore object which can represent multiple heterogeneous datastores at any given time, or which is directly manipulatable by a user/application to provide a user/application with the ability to 'see' or directly access different datastores and features of them through the federated datastore object.

Other known programming tools that can be used for developing search and result-management frameworks include IBM VisualAge C++, Microsoft Visual C++, Microsoft Visual J++, and Java. These systems provide tools such as collection objects and iterators, however, these systems only employ flat collections which do not provide users with useful access to sub-units within the collections.

SUMMARY OF THE INVENTION

It is therefore an object of the present invention to provide multi-searching and updating capabilities across a combination of heterogeneous datastores.

It is an object of the present invention to provide a flexible mechanism which can employ a combination of different types of search engines selectable by users, e.g., SearchManager/TextMiner, QBIC, etc., and allow users to formulate and submit parametric, text, and/or image queries against heterogeneous datastores and get back the results in a consistent, uniform format.

It is an object of the present invention to allow an application program to manipulate data objects as a group or collection and at the same time preserve the sub-grouping relationship that exists between the objects. Such a collection can be used to represent the results of a query against heterogeneous datastores so that the combined results constitute a collection of collections of results from each datastore. The client application/user then has a choice to iterate over the whole combination of results as a flat collection or to iterate over each subcollection individually, while preserving the sub-grouping information and relationships.

It is an object of the present invention to allow a user/application to combine several datastores in a digital library domain to form a unified conceptual view in which multi-search queries can be formulated, executed, and coordinated to produce results in a consistent format.

It is an object of the present invention to provide these and other capabilities in a common object model for Digital Library types of data access.

Accordingly, the present invention provides a common object model in an object-oriented environment which includes a federated query object, a federated collection object, and a federated datastore object. These three objects separately and together provide client applications/users with capabilities to efficiently and powerfully search, and manage the search results from heterogeneous datastores. The present invention thereby relieves the user/application with the burden of having to directly manipulate each of the heterogeneous datastores, without removing the user's/application's ability to directly manipulate features of particular datastores if desired.

For example, the federated query object can coordinate query processing functions such as translation, filtering, merging, and data conversion for multiple heterogeneous datastores in a single query. Subqueries managed by a federated query object include parametric, text, image, SQL, and combined queries, even if the various subqueries are for different datastores (e.g., DB2, Visual Info, On Demand, Digital Library, etc . . . ). The federated query object can even have another federated query object as a subquery.

The federated collection object returns the query results in a uniform and datastore-neutral format, which can be processed as a flat collection or as sub-collections according to the source datastores.

The federated datastore object can provide a unified conceptual view of all of the included datastores. The federated datastore can combine the participating datastores in two levels: without mapping to reflect the results as a single union; and with mapping of concepts in each datastore to relate/equate data in one datastore to another. The concept mapping enables a user to follow links and join tables as part of a query where the result of a first datastore links to data in another, for example.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF PREFERRED EMBODIMENTS

A preferred embodiment of a method and architecture according to the present invention is described below in detail with reference to the accompanying drawings. The present invention is described herein by way of example and is not intended to be limited to the described embodiment. The description of the preferred embodiment is based on, but certainly not limited to, the IBM design of Java Grand Portal, the Digital Library Java Application Programming Interface (API), which is herein incorporated by reference.

Java Grand Portal is a set of Java classes which provides access and manipulation of local or remote data stored in Digital Library storage facilities. It uses a Java Class Library API based on OMG-Object Query Services (OQS) and a Dynamic Data Object protocol, which is a part of OMG/Persistence Object Services.

The Java API provides multi-search capabilities such as:

Searching within a given datastore using one or a combination of supported query types, i.e.

Parametric query—Queries requiring an exact match on the condition specified in the query predicate and the data values stored in the datastore.

Text query—Queries on the content of text fields for approximate match with the given text search expression, e.g. the existence (or non-existence) of certain phrases or word-stems.

Image query—Queries on the content of image fields for approximate match with the given image search expression, e.g. image with certain degree of similarity based on color percentages, layout, or texture.

Each search type is supported by one or more search-engines.

Searching on the results of a previous search.

Searching involving heterogeneous datastores.

1. Architecture

Figure 7:
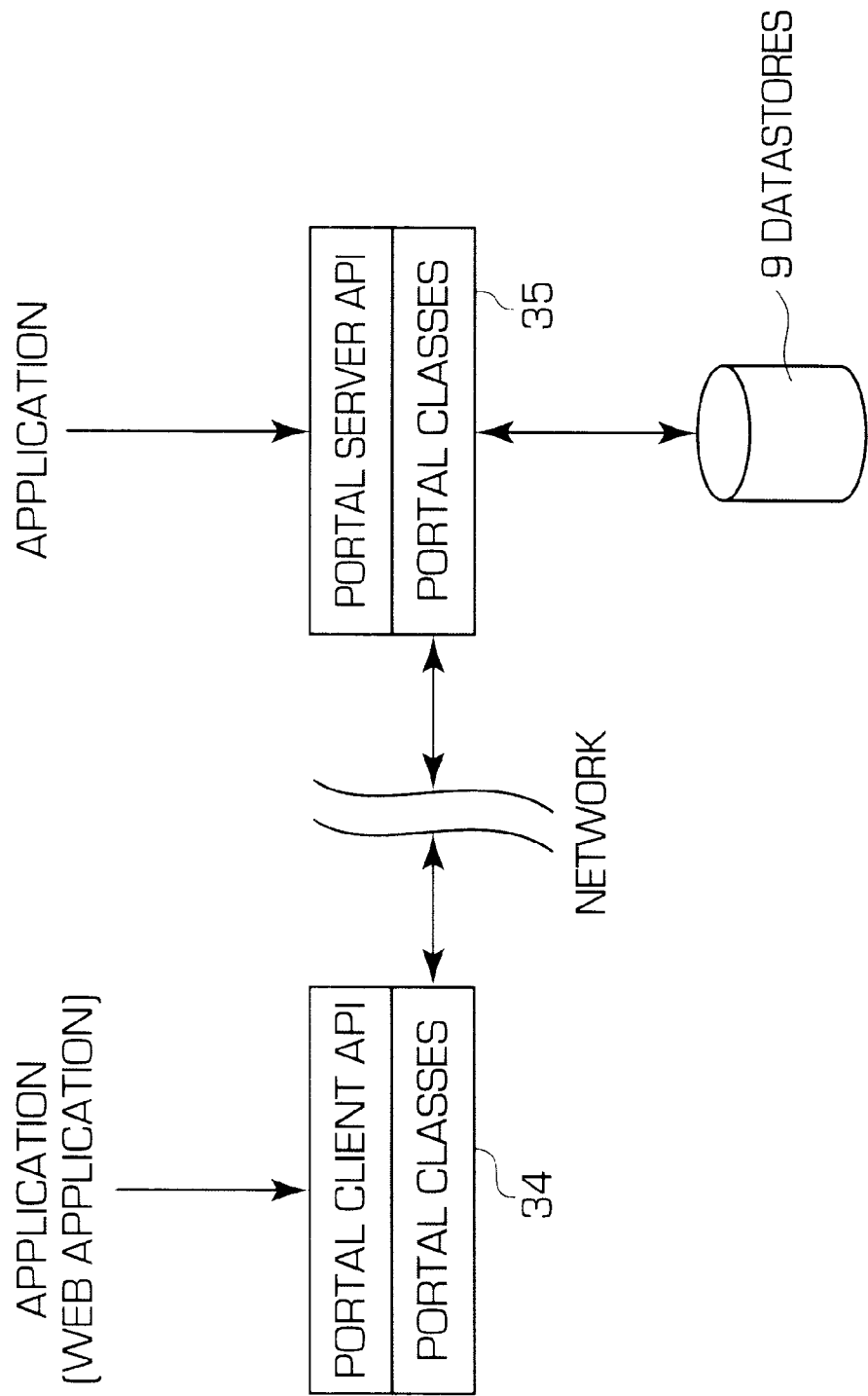
FIG. 7 is a diagram of a client/server model according to an embodiment of the present invention.

FIG. 7 shows the overall client/server architecture of the preferred embodiment. The Digital Library Java Grand Portal classes provide a convenient API for Java application users; the applications can be located at local or remote sites. Java classes will typically reside on both server and client sides; both sides providing preferably the same interface. The client side of Java classes communicates with the server side to access data in the Digital Library through the network. Communication between client and server sides is done by Java classes; it is not necessary to add any additional programs.

The Digital Library Java Grand Portal classes are grouped in three packages, client, server, and common. The client and server packages provide the same API, but have different implementations.

The server classes connect directly to Digital Library facilities and expose most of the functionalities provided by the datastore The client classes are not directly connected to Digital Library, but communicate with the server classes through the network by invoking the server classes to execute and retrieve results The common classes are shared by both the client and server classes The server components of the preferred embodiment are written in Java, except the portions that provide data access and manipulation using the underlying datastore facilities. These portions are implemented in native C methods, which in turn, call the API provided by the given datastore. The Java code is portable to any platform, except the one which contains native methods. For that reason, the size of the native C code is kept minimal.

The number of client components in the preferred embodiment is the same as the number of server components. Their public methods also correspond to one and another. However, since the implementation for the client components is different from the server, local classes and functions might also be different. The client components package name is COM.ibm.mm.sdk.client.

2. Packaging for the Java Environment

Java provides the concept of a package which is a grouping of classes. Typically, the classes in a package have strong inter-relationships among them. Class members that are not explicitly declared as public, private, or protected can only be seen by classes in the same package. The package environment provides a convenient means to associate the classes within the package. The Java compiler associates a directory structure matching the full package names.

Package Hierarchy

The following is an example package structure:

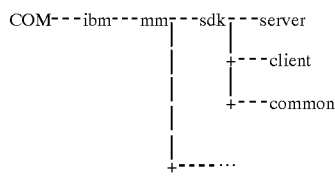

The above digital library package hierarchy starts with COM followed by ibm to distinguish it from the products of other companies. The subdirectory mm under ibm directory indicates that these classes are for handling multi-media data, which is the main form of content of Digital Library repositories. The subdirectory sdk under mm directory indicates that this is the software developer kit's package. There are three packages: client, server, and common. The server package is implemented for access and manipulation of Digital Library information. The client package is implemented for communication with server package, network control, and data transformation between server and client sites. A user installs one of these packages: the server package for local applications, or the client package for applications that access the remote server. As mentioned before, the common package contains shared classes that are used by both the client and server packages.

3. Class Overview

Figure 1:
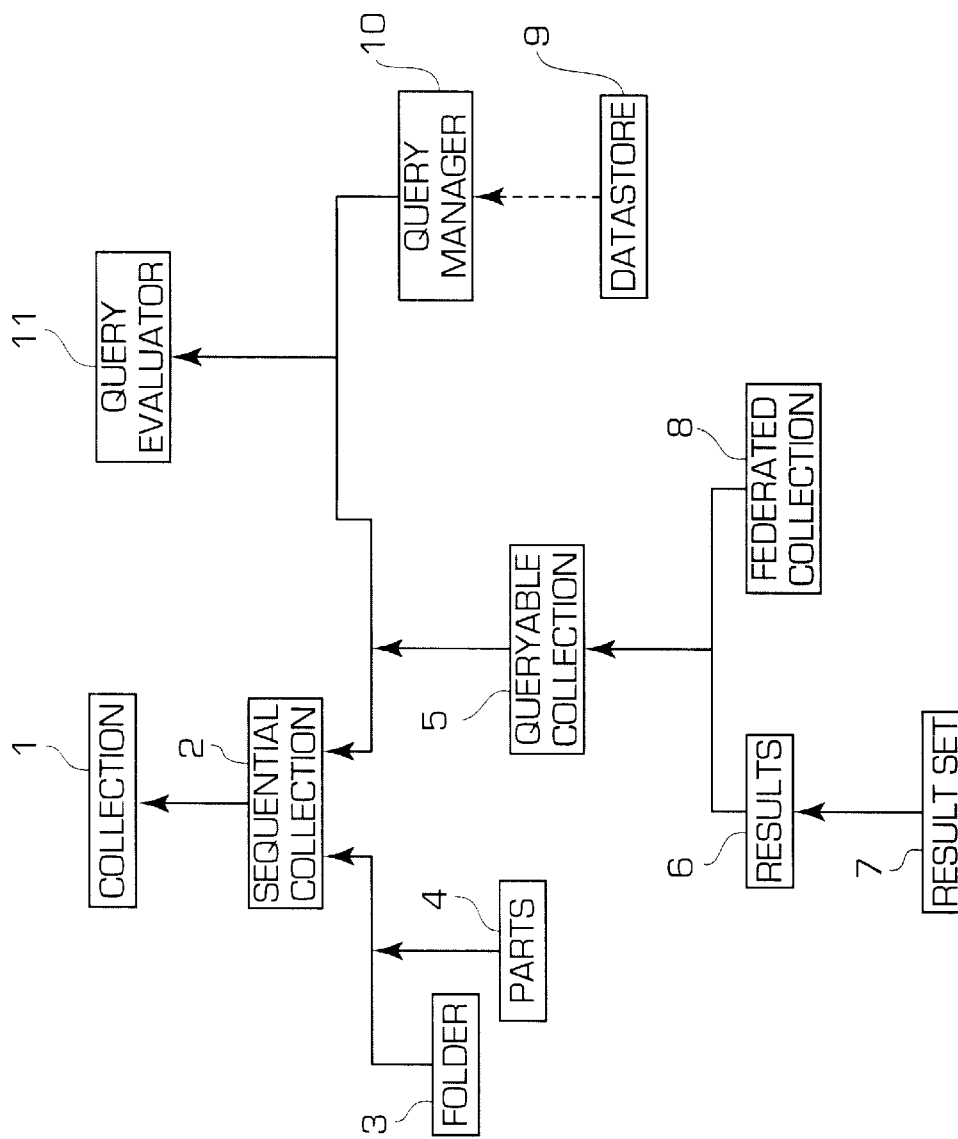
FIG. 1 is a diagram of collection and query evaluator classes according to an embodiment of the present invention.
Figure 2:
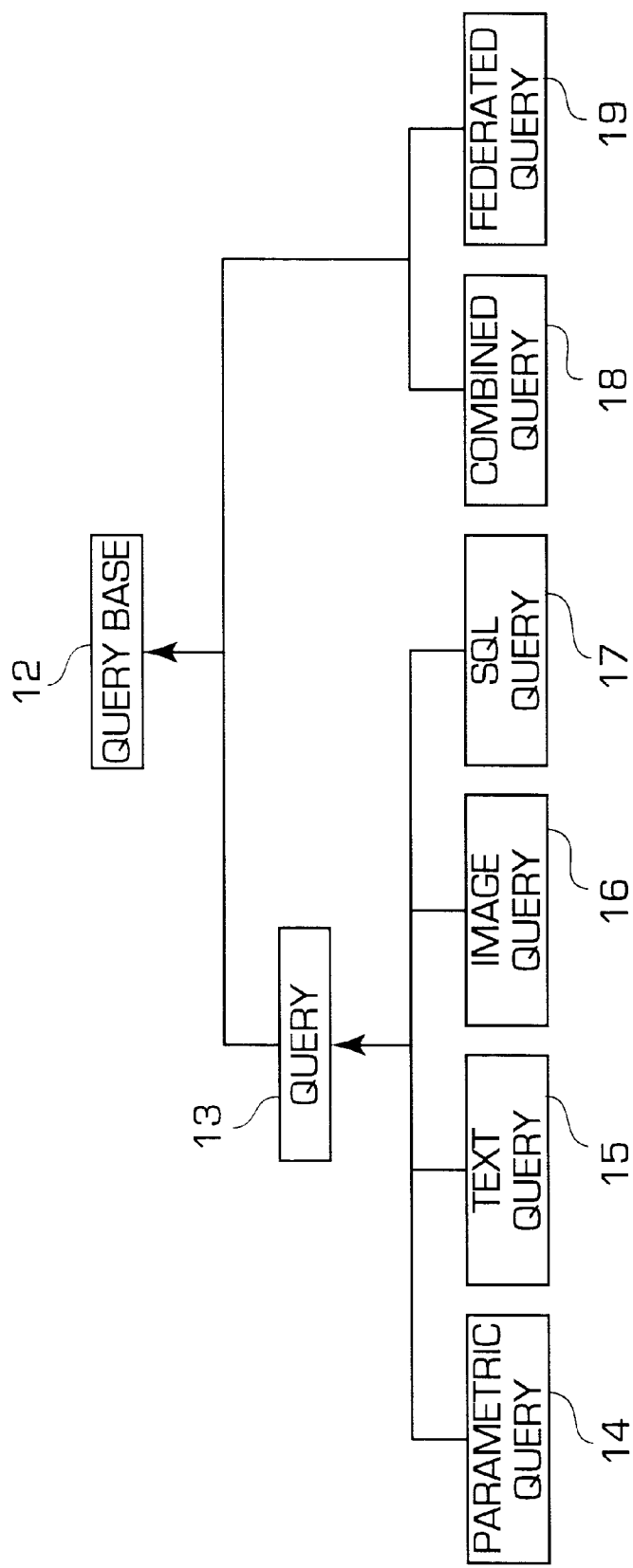
FIG. 2 is a diagram of query classes according to an embodiment of the present invention.

With reference primarily to FIGS. 1 and 2, the preferred embodiments' main classes, their descriptions, and hierarchies are described below.

Query Evaluator Classes

As shown in FIG. 1, the query evaluator class 11 and its subclasses include a method to evaluate a query. The result of this evaluation is a queryable collection 5, which is an object subclass of both collection 1 and query evaluator 11, i.e. it is a collection of objects which can further evaluate queries against its members. A query manager 10 is a special query evaluator which can create query objects. A datastore 9 is also a special query evaluator that can create and evaluate queries on the collection of objects stored in its physical storage (i.e. Digital Library repositories). Various classes are described below.

| Class Name | Description |
| --- | --- |
| Collection 1 | represents a collection of objects |
| Iterator 36 | to iterate over collection members. It has subclasses to match each collection type. |
| SequentialCollection 2 | a collection which supports sorting and provides sequential access to its member, forward and backward. |
| QueryableCollection 5 | a sequential collection to store the result or scope of a query, which, in turn, can be queried further |
| Results 6 | a sequential collection to store the result or scope of a query |
| FederatedCollection 8 | a nested collection that contains the result of a federated query |
| QueryEvaluator 11 | to evaluate queries |
| QueryManager 10 | to create and evaluate queries |
| Datastore 9 | represents a data storage facility. In general, it supports query creation and processing, connection, transaction, CRUD operations (add, retrieve, update, and delete), etc. |

Query Classes

FIG. 2 shows the class hierarchy for query classes. Query classes have query processing capabilities, such as preparing, executing, and monitoring the status of query executions. There is a query class for each type of query. The query classes work with a query manager 10 or datastore class 9 in processing a query. The results are returned in the form of a Collection 1 of objects, e.g. Results 6 (FIG. 1). For federated queries 19, the result is returned in a federated collection 8, that is a nested collection of results of each query's components. A user may then create a federated iterator 38 (FIG. 8) to iterate over the results across collection boundaries. Alternatively, the user may chose to create a sequential iterator 36 to access member collections and process them separately.

| Class Name | Description |
| --- | --- |
| QueryBase 12 | the base class for query objects |
| Query 13 | the class for a query object which is associated with a specific datastore. |
| ParametricQuery 14 | represents a parametric query which can be prepared, executed, and queried on the status of query processing |
| TextQuery 15 | similar to parametric query objects, except for text |
| ImageQuery 16 | similar to parametric query objects, except for images |
| SQLQuery 17 | similar to parametric query objects, except for SQL queries |
| CombinedQuery 18 | represents combined queries; a combination of parametric, text, and image queries, which can be executed together |
| FederatedQuery 19 | represents an aggregation of heterogeneous queries, e.g. DL Parametric query, OnDemand, and other queries to heterogeneous datastores |

Data-Object classes

Figure 3:
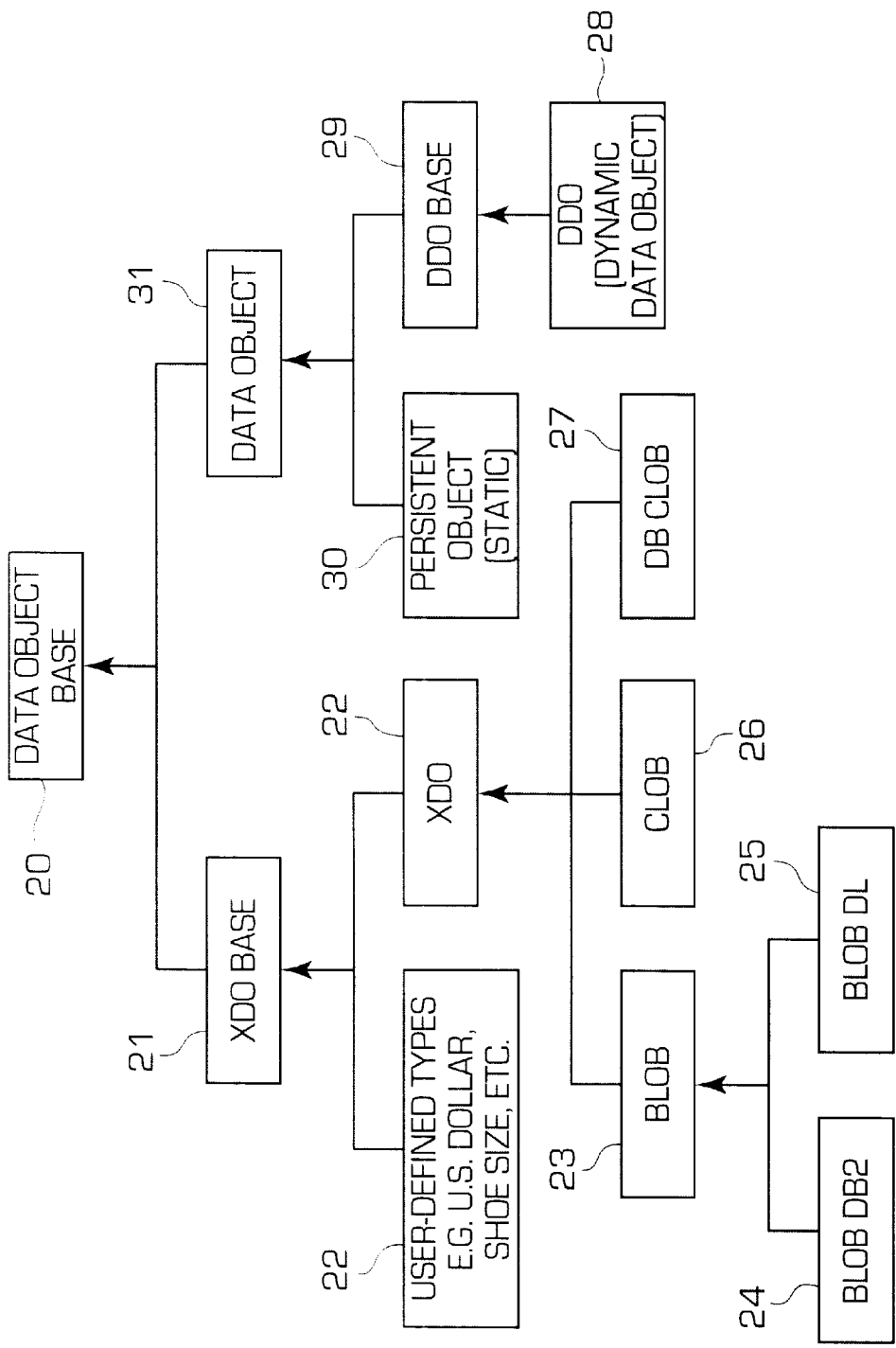
FIG. 3 is a diagram of data object classes according to an embodiment of the present invention.

FIG. 3 shows the class hierarchy for Data Object classes. The objects stored in and manipulated by the datastore 9 and query operations belong to data object classes. These objects are returned as the result of a query, or created and used in CRUD (add, retrieve, update, delete) operations.

| Class Name | Description |
| --- | --- |
| DataObjectBase 20 | the abstract base class for all data objects known by datastores. It has a protocol attribute, that indicates to the datastore which interface can be used to operate on this object. |
| XDOBase 21 | the base class to represent user-defined-types (UDT) or large objects. |
| XDO 22 | represents complex UDTs or large objects (LOB). This object can exist stand-alone or as a part of a DDO 28. Therefore, it has a persistent object id and CRUD operations capabilities. |
| Blob 23 | a base class for BLOBs as a placeholder to share all generic operations pertaining to BLOBs. |
| Clob 26 | a base class for CLOBs (Character Large Objects) as a placeholder to share all generic operations pertaining to CLOBs. |
| DBClob 27 | a base class for DBCLOBs (database character large object) as a placeholder to share all generic operations pertaining to DBCLOBs. |
| BlobDL 25 | represents a BLOB specific to DL |
| ClobDL | represents a CLOB specific to DL |
| DBClobDL | represents a DBCLOB specific to DL |
| PersistentObject 30 | represents a specific object whose code is statically generated and compiled. This type of object will not be covered in this document. |
| DDO 28 | (Dynamic Data Object) represent generic data objects which are constructed dynamically at runtime. This object fits well with query and browsing activities in Portal where objects are only known and generated at runtime. It supports the CRUD operations (add, retrieve, update, and delete), therefore, with the help of its associated datastore DDO 28 can put itself in and out of the datastore. |
| DDOBase 29 | the base class for DDO 28, without the CRUD methods |

4 Class Dynamics

This section provides an overview on how the above classes interact with one another. To get a better understanding of the scenario presented, refer to the particular class descriptions in the next sections and Section 12, "Sample Programs".

Figure 4:
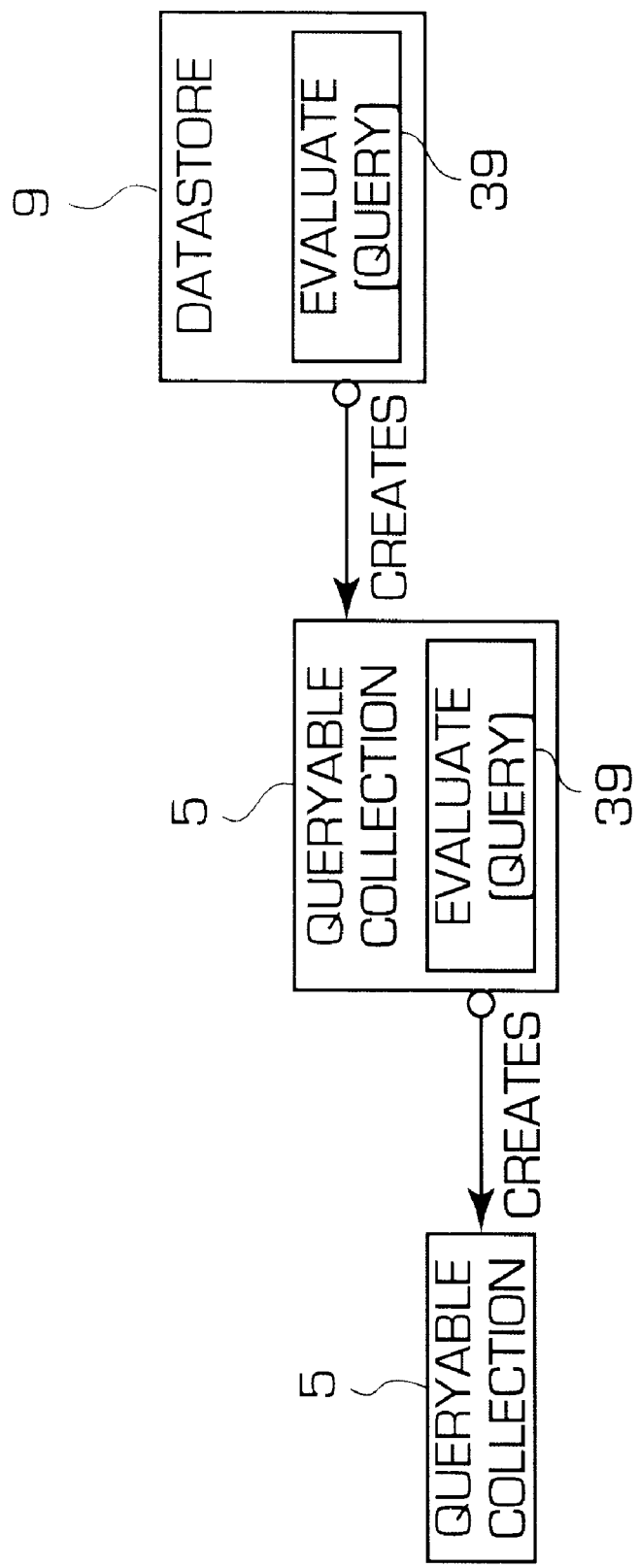
FIG. 4 is a flow chart showing the evaluation of queries according to an embodiment of the present invention.

As shown in FIG. 4, when a user wants to submit a query, he/she can start by creating a specific datastore object 9 to give him/her access to the query processing functions provided by that datastore 9. Such a datastore 9 could be DatastoreDL, for example.

The next step would be to call the "evaluate" method on the datastore 9 and supply a query string and other parameters, or a query object 13. The result of the "evaluate" method 39 is a queryable collection object 5, which also includes the "evaluate" method 39, so that it can evaluate the next query, and so on. In the preferred embodiment, the subsequent query evaluated by a queryable collection must match or be consistent with the member of the queryable collection. Otherwise, an exception is thrown.

Usually the result of a query evaluation is a subset of the present collection, i.e. it could be the proper subset or even an empty collection. In addition to the query evaluation capability, a queryable collection object can be used as an input scope for the execute method in query objects.

It is recommended that users create a queryable collection object 5 using the "evaluate" method 39, either in the datastore 9 or in the source queryable collection 5. However, a user can create a queryable collection 5 and fill it up with elements he/she created. Since a queryable collection may need help from a datastore object 9 in its query processing tasks, the user may need to associate it with the corresponding datastore object 9. This is done by passing a datastore object 9 as an input to the constructor.

Figure 5:
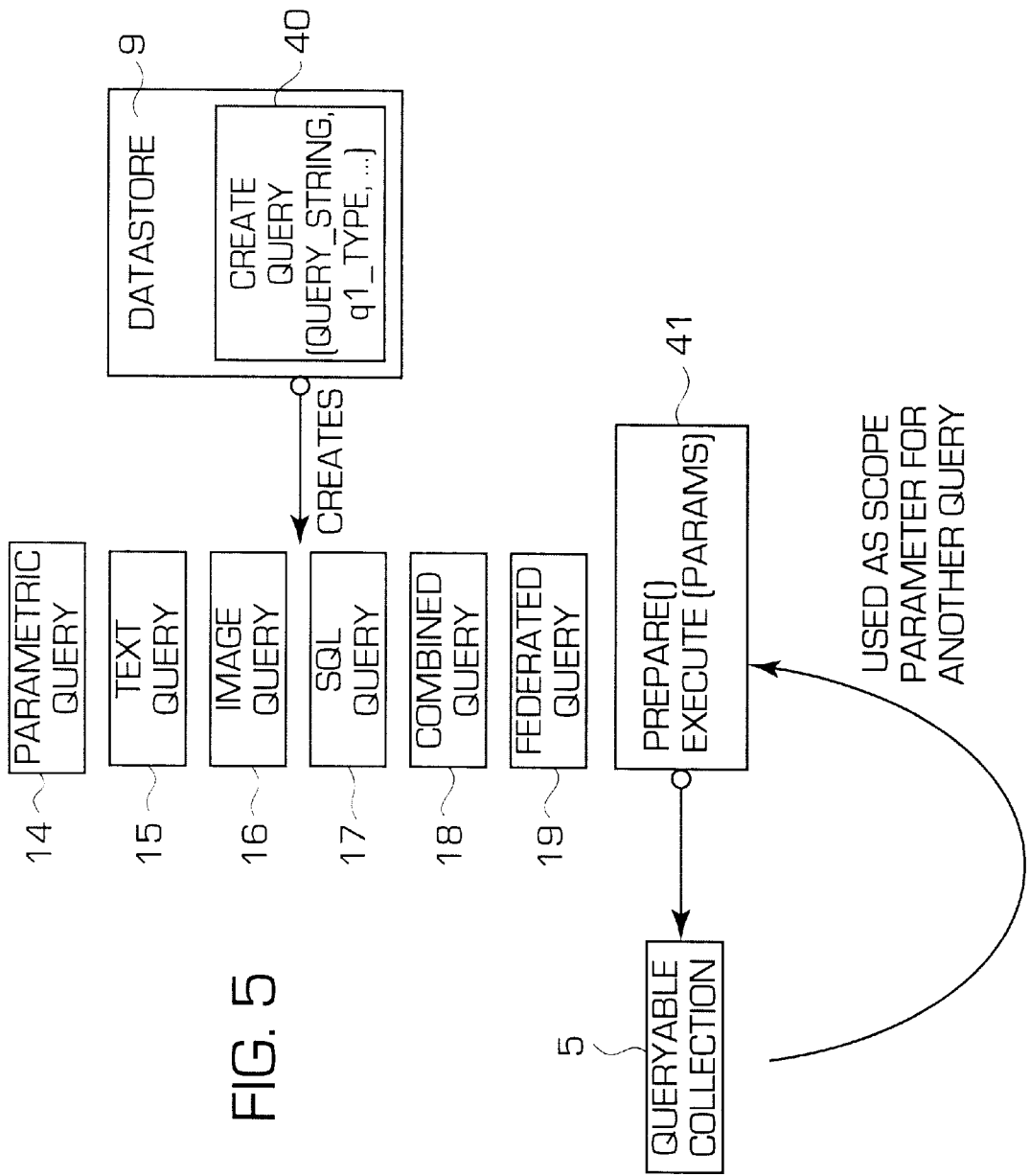
FIG. 5 is a flow chart showing the execution of queries according to an embodiment of the present invention.

As shown in FIG. 5, another way to process a query is by creating a query object specific to the type of query language. Query objects 13 are created using the createQuery() method 40 in the datastore 9. This method of creation is preferable to ensure that the created query object 14–19 will have all the necessary information and can always get help from the datastore 9 in processing the query. A query object 14–19 can prepare and execute the query. As mentioned before, the execute method 41 may take a queryable collection 5 as an input parameter to limit the scope of the query 14–19.

Figure 6:
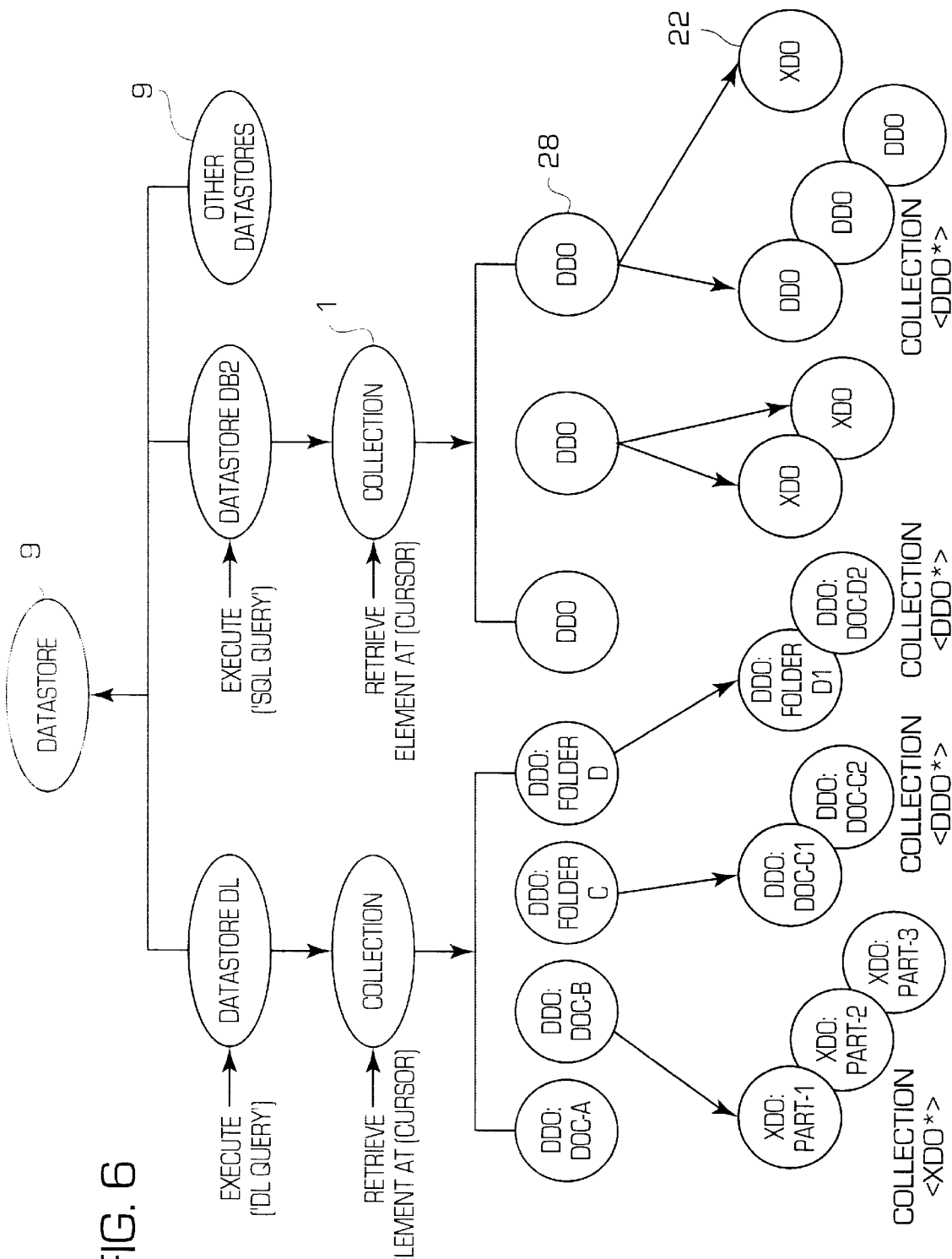
FIG. 6 is a diagram representing folders, documents, and rows using Dynamic Data Objects (DDOs) and Extended Data Objects (XDOs) according to an embodiment of the present invention.

As shown in FIG. 6, the result of a query is a collection 1 of objects containing Dynamic Data Objects (DDOs) 28 inside. A DDO 28 has attributes, with type, value, and properties. The value of an attribute can be a reference to another DDO 28 or XDO 22, or a collection of DDOs 28 or XDO 22s, thus it may form a tree structure. This structure is quite general and flexible enough to represent folder and document data models in DL, as well as an object-oriented view of relational databases.

Figure 8:
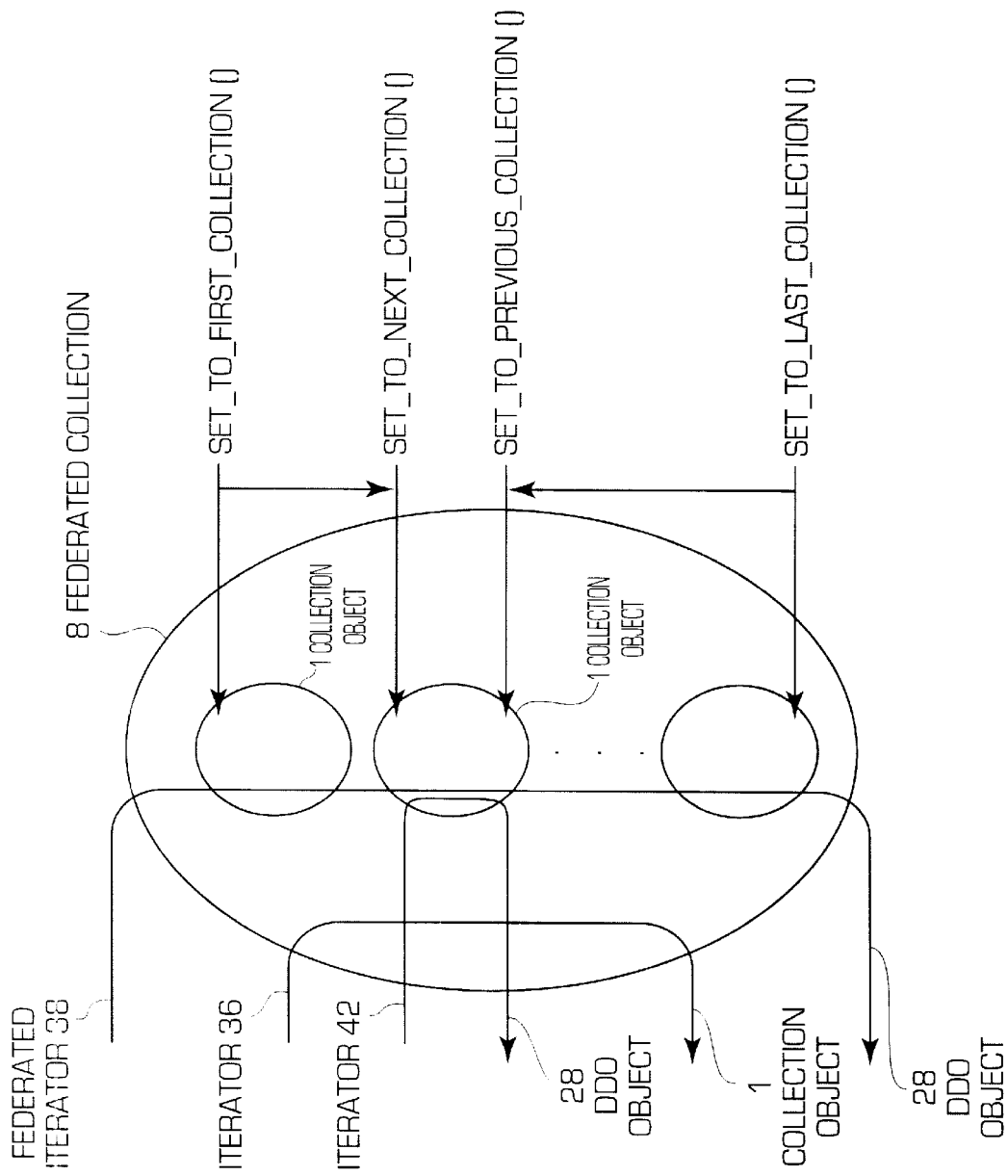
FIG. 8 shows the structure of a federated collection according to an embodiment of the present invention.

As shown in FIG. 6, the user creates a datastore 9 (DL or DB2) then executes a proper query. The result is a collection of DDOs 28, which can be iterated over using an iterator 36 (FIG. 8).

Representing DL Folders and Documents

Depending on the query, each element in the resulting collection 1 can be a combination of documents, documents with parts, folders, or folders containing other folders and documents. All of these results are represented as DDOs 28. Parts 4 within a document becomes a data-item in the DDO 28 with the name "Parts", and its value is a pointer to a collection of XDOs 22 representing DL parts. A folder DDO 28 has attributes and properties of the corresponding DL folder. It has a data-item with the name "Folder" which is a pointer to a collection of DDOs 28 representing the content of the folder. Each DDO 28 in the folder, in turn, can be another folder or simply a document. DDOs associated with DL datastores have several standard fields of information, described as follows:

| Name | Description |
| --- | --- |
| ItemType | a property of the whole DDO 28 (not to a particular data-item) taking the value of DOCUMENT or FOLDER |
| ItemId | ItemId is not represented directly as a data_item (DDO 28 attribute) but kept in Pid as a data member Id. The user can access it via method ddo.getPid( ).getId( ). This scheme avoids duplication and is consistent with the underlying representation inside DL datastore. |
| Rank | an integer number representing the computed ranking of this result. Rank is stored as a DDO 28 data-item (attribute) with the reserved name "Rank". This DDO 28 data-item has a transient property (not persistent), since it does not actually exist as a DL item attribute. Ranking is only appropriate for query results coming from a non-parametric query, such as text, image query, or combined query. |

5 Object Collection classes 5.1 Collection

Collection 1 defines a base public interface for the collection of objects. In the preferred embodiment, collection 1 can not evaluate a query. A collection 1 may have a name (the default name is an empty string), but it could be set to anything, for example the name of the DL index class or table where the members belong. It functions as described in IBM manual, Digital Library Application Programming Guide and Reference for the Internet Connection, Doc. No. SC26-8868-00. A sample definition of the collection class is defined below.

```
Collection.java package COM.ibm.mm.sdk.server;
public interface Collection
{
    public int    cardinality( ) ;
    public Object retrieveElementAt(Iterator where) ;
    public Iterator createIterator( ) ;
    public void addElement(Object element) ;
    public void addAllElements(Collection elements) ;
    public void insertElementAt(Object element, Iterator where) ;
    public void replaceElementAt(Object element, Iterator where) ;
    public void removeElementAt(Iterator where) ;
    public void removeAllElements( ) ;
    public String getName( ) ;
    public void    setName(String collName) ;
};
```

5.2 SequentialCollection

SequentialCollection 2 is a subclass of collection 1, which supports sorting and sequential accessing, in forward and backward directions. It functions as the SimpleCollection described in IBM manual, Digital Library Application Programming Guide and Reference for the Internet Connection, Doc. No. SC26-8868-00. A sample sequential collection is defined below.

```
SequentialCollection.java package COM.ibm.mm.sdk.server;
public class SequentialCollection extends Collection
{
    public SequentialCollection( ) ;
    public int cardinality( ) ;
    public Iterator createIterator( ) ;
    public Object retrieveElementAt(Iterator where) ;
    public void addElement(Object element) ;
    public void addAllElements(Collection elements) ;
    public void insertElementAt(Object element, Iterator where) ;
    public void replaceElementAt(Object element, Iterator where) ;
    public void removeElementAt(Iterator where) ;
    public void removeAllElements( ) ;
    public int    sort(Object SortFunction, int    SortOrder) ;
};
```

5.3 Folder

Folder 3 is a subclass of sequential collection 2. Its purpose is to hold document DDOs 28 and folder DDOs 28 as members of a DL folder. The DDO 28 representing a DL folder has an attribute with a reserved name Folder as a reference to a Folder 3 collection. The public interface of Folder 3 is the same as of sequential collection 2, but internally, it keeps track of member addition and deletion to be reflected when the object is saved to the DL datastore 9.

In addition to the methods inherited from the sequential collection class 2, Folder 3 has two additional methods:
public void addMember(DDO folder, DDO member) throws Exception;

Adds the member item into the folder and reflects the results immediately in the datastore. At the end of the operation the member item will be in the Folder 3 collection in memory as well as in the folder in the datastore. public void removeMember(DDO folder, DDO member) throws Exception;

Removes the member item from the folder and reflects the results immediately in the datastore. At the end of the operation the member item will not be in the Folder 3 collection in memory and also removed from the folder in the datastore.

5.4 Parts

Parts 4 is a subclass of sequential collection 2. Its purpose is to hold Part XDO 22 members of a DL document. The DDO 28 representing a DL document has an attribute with a reserved name Parts as a reference to a Parts 4 collection. The public interface of Parts 4 is the same as of sequential collection 2, but internally it keeps track of member addition and deletion to be reflected when the object is saved to the DL datastore. In addition to the methods inherited from the sequential collection class 2, Parts 4 has two additional methods:

public void addMember(DDO item, XDO member) throws Exception;

Adds the member part into the parts collection and reflects the results immediately in the datastore. At the end of the operation, the member item will be in the part collection in memory as well as inside the item in the datastore 9. This operation has the same effect as the sequence of member. add () and parts. addElement (member) where member is the part xdo and parts is the collection of parts in this item.

public void removeMember(DDO item, XDO member) throws Exception;

Removes the member part from the parts collection and reflects the results immediately in the datastore 9. At the end of the operation the member part will not be in the Folder 3 collection in memory and also deleted from the item in the datastore 9. This operation has the same effect as the sequence of parts.removeElement(member) and member.del() where member is the part xdo and parts is the collection of parts in this item.

5.5 QueryEvaluator

A query evaluator 11 is an abstract class which has the capability of evaluating queries over an implicit or explicit collection of objects 1. Its subclass includes QueryableCollection 5, which maintains an explicit collection, and Datastore 9, which has an implicit collection (i.e. the database). Since Java does not allow multiple inheritance, QueryEvaluator 11 is defined as an interface so that QueryableCollection 5 can inherit from both SequentialCollection 2 and this interface. A sample QueryEvaluator class is defined below.

```
QueryEvaluator.java package COM.ibm.mm.sdk.server;
public interface QueryEvaluator
{
    public Object evaluate(String query,
                           short ql_type,
                           NVPair params[ ] ) ;
};
```

5.6 QueryableCollection

A queryable collection 5 is a subclass of both query evaluator 11 and sequential collection 2 classes, therefore it can evaluate queries on its members. It can be used to store the result or scope of a query, which, in turn, can be queried further. For example, the result of the Datastore. evaluate() method is a QueryableCollection object 5 which also implements the evaluate() method 39, so it can evaluate a query using its current collection of members as the scope. Queryable collection 5 functions as described in IBM manual, Digital Library Application Programming Guide and Reference for the Internet Connection, Doc. No. SC26-8868-00. A sample QueryableCollection is defined below.

```
QueryableCollection.java package COM.ibm.mm.sdk.server;
public abstract class QueryableCollection extends SequentialCollection
                                          implements QueryEvaluator
{
    public QueryableCollection( ) ;
    public QueryableCollection(Datastore ds) ;
    public QueryableCollection(QueryableCollection fromCollect) ;
    public abstract int cardinality( ) ;
    public abstract Iterator createIterator( ) ;
    public abstract Object retrieveElementAt(Iterator where) ;
    public abstract void addElement(Object element) ;
    public abstract void addAllElements(QueryableCollection elements) ;
    public abstract void insertElementAt(Object element,
                                         Iterator where) ;
    public abstract void replaceElementAt(Object element,
                                          Iterator where) ;
    public abstract void removeElementAt(Iterator where) ;
    public abstract void removeAllElements( ) ;
    public abstract Object evaluate(String query, short ql_type,
                                    NVPair params [ ]) ;
};
```

5.7 FederatedCollection

The structure and behavior of a preferred embodiment of a FederatedCollection 8 is illustrated in FIG. 8. In the preferred embodiment, a FederatedCollection 8 allows an application program to process data objects resulting from a query as a group or collection and at the same time preserves the sub-grouping relationships that exist between them. It provides the user with a mechanism:

- to aggregate several collections of data objects while preserving each individual collection's information
- to treat these collections as one whole unit of collection, ignoring collection boundaries A federated collection 8 is a collection containing Results objects 6; it is created to hold the results of a PederatedQuery 19, which may come from several heterogeneous datastores 9. Each Results 6 contains the results of a subquery of the FederatedQuery 19 submitted to a specific native datastore 9 associated with the federated datastore 37.

As shown in FIG. 8, the biggest oval represents the FederatedCollection 8 containing several smaller ovals which are collection objects 1. A FederatedCollection 8 can also contain individual Results objects 6. The FederatedIterator 38 traverses through the whole contents of FederatedCollection 8, across collection 1 boundaries, each time returning a DDO 28 (a non-collection object). The first Iterator 36 is a regular iterator for FederatedCollection 8, thus each time returning a collection object 1. The second Iterator 42 is an iterator for a collection object 1, therefore it returns DDOs 28 as members of the collection 1. The method SetToFirstCollection() in the FederatedIterator 38 will set the iterator position to the first non-collection element of the FederatedCollection 8; in this case, it would be the first element of the first collection object 1. At this point, if the method setToNextCollection() is invoked, it will set the iterator position to the first non-collection element of the second collection 1.

The method setToLastCollection() in the FederatedIterator 38 will set the iterator position to the last non-collection element of the FederatedCollection 8; in this case, it would be the last element of the last collection object 1. As the opposite of setToNextcollection(), at this point, if the method setToPreviousCollection() is invoked, it will set the iterator position to the last non-collection element of the previous collection 1.

Thus to iterate over a FederatedCollection 8, a user/application has a number of tools or approaches. A user can create and use Iterator 36 or a SequentialIterator (not shown) to pull each collection object 1. Then he/she could create another Iterator 36 on this collection 1 to iterate over it and to process the result according to its datastore origin. Alternatively, the user can create a federated iterator, FederatedIterator 38, and use it to iterate over all element members across collection boundaries, regardless of which datastore 9 the result came from.

A FederatedCollection public class interface is set forth below. A federated collection object 8 can contain other nested collections up to any arbitrary depth. In the preferred embodiment shown below, a federated collection object is not queryable, however, this capability could be added if desired by changing "SequentialCollection" in the second line to "QueryableCollection." See also 5.11 . "FederatedIterator", 5.9 "Iterator", 5.10, "SequentialIterator".

```
FederatedCollection.java package COM.ibm.mm.sdk.server;
public class FederatedCollection extends SequentialCollection
{
    public FederatedCollection( ) ;
    public int cardinality( ) ;
    public int memberCardinality( ) ;
    public Iterator createIterator( ) ;
    public Iterator createMemberIterator( ) ;
    public Object retrieveElementAt(Iterator where) ;
    public void addElement(Object element) ;
    public void addAllElements(QueryableCollection elements) ;
    public void insertElementAt(Object element, Iterator where) ;
    public void replaceElementAt(Object element, Iterator where) ;
    public void removeElementAt(Iterator where) ;
    public void removeAllElements( ) ;
};
```

5.7.1 Methods public int cardinality(); /*Returns the number of all individual (leaf) elements (non-collection) across the collection boundaries. This is the total of all elements in each of the sub-collections. */ public int memberCardinality(); /*Returns the number of elements in the collection. The element could be a collection object, i.e. a Results object 6, not necessarily a leaf element (non-collection). */ public Iterator createIterator(); /*Creates a new FederateIterator for this federated collection. This iterator can be used to iterate over the federated collection, across collection boundaries, returning a (non-collection) member one at a time. */ public Iterator createMemberIterator(); /*Creates a new iterator for this federated collection. The new iterator would be supporting SequentialIterator interface. That is, the method next of this iterator would return a collection, such as Results object 6. A user can then create an iterator on the Results 6 to iterate over its members. */

5.8 Results

Results 6 is a subclass of QueryableCollection 5, therefore it supports sorting and bi-directional iterators, and is queryable. Element members of Results 6 are objects, instances of DDO 28, which represent hits from a query. The iterator created by this class is SequentialIterator or BidirectionalIterator. Besides being queryable, Results 6 functions as described in IBM manual, Digital Library Application Programming Guide and Reference for he Internet Connection, Doc. No. SC26-8868-00. Below is an example of a Results 6 definition.

---
Results.java
---
```
package COM.ibm.mm.sdk.server;
public class Results extends QueryableCollection
{
    public Results(Datastore ds) ;
    public Results(Results fromResults) ;
    public int cardinality( ) ;
    public Iterator createIterator( ) ;
    public Object retrieveElementAt(Iterator where) ;
    public void addElement(Object element) ;
    public void addAllElements(QueryableCollection elements) ;
    public void insertElementAt(Object element, Iterator where) ;
    public void replaceElementAt(Object element, Iterator where) ;
    public void removeElementAt(Iterator where) ;
    public void removeAllElements( ) ;
    public Object evaluate(String query, short ql_type,
                                              NVPair params[ ] ) ;
};
```
---

5.9 Iterator

Iterator is a base abstract class of iterators. Iterators, such as those shown in FIG. 8 (36, 42) are used to iterate over collections of members. The Iterator class has subclasses to match each collection type. It functions as described in IBM manual, Digital Library Application Programming Guide and Reference for the Internet Connection, Doc. No. SC26-8868-00. Below is an example of an iterator definition.

---
Iterator.java
---
```
package COM.ibm.mm.sdk.server;
public interface Iterator
{
    public Object    next () throws Exception;
    public void      reset ();
    public boolean   more ();
};
```
---

5.10 SequentialIterator

A sequential iterator is bidirectional, it can go forward and backward over members of SequentialCollection 2. It functions as does the SimpleIterator described in IBM manual, Digital Library Application Programming Guide and Reference for the Internet Connection, Doc. No. SC26-8868-00. Below is an example of a Sequential Iterator definition.

---
SequentialIterator.java
---
```
package COM.ibm.mm.sdk.server;
public interface SequentialIterator extends Iterator
{
    public Object    previous () throws Exception;
    public Object    at () throws Exception;
    public boolean   setToFirst ();
    public boolean   setToLast ();
    public boolean   setToNext ();
    public boolean   setToPrevious ();
};
```
---

5.11 FederatedIterator

A federated iterator 38 is used to iterate over the collective members of FederatedCollection 8 across collection boundaries. The next() method will return DDOs 28 until all collections 1 are iterated over. This iterator is created by invoking the method createIterator() in the FederatedCollection object 8.

See also 5.9. "Iterator" and 5.10, "SequentialIterator".

---
FederatedIterator.java
---
```
package COM.ibm.mm.sdk.server;
public interface FederatedIterator extends SequentialIterator
{
    // from Iterator
    public Object    next () throws Exception;
    public void      reset ();
    public boolean   more ();
    // from SequentialIterator
    public Object    previous () throws Exception;
    public Object    at ()          throws Exception;
    public boolean   setToFirst ();
    public boolean   setToLast ();
    public boolean   setToNext ();
    public boolean   setToPrevious ();
    // new methods
    public boolean   setToFirstCollection ();
    public boolean   setToLastCollection ();
    public boolean   setToNextCollection ();
    public boolean   setToPreviousCollection ();
};
```
---

In the preferred embodiment, the federated iterator methods always return or point to an element which is not a collection. If the element is a collection, it goes inside the collection to find the proper element of this collection, and so forth until it finds an element which is not a collection.

5.11.1 Methods public Object next() throws Exception; /* Returns the current element in the collection 1 and advances the iterator to the next position. In case the element is a collection 1, it goes inside that collection 1 and retrieves the first element recursively, until it finds an element which is not a collection 1. When the current collection 1 is exhausted, this iterator will find the next collection 1 and extract the first element (non-collection) from it.*/ public void reset(); /*Resets the iterator to the beginning of FederatedCollection 8.*/ public boolean more(); /*Returns true if there are more elements in the FederatedCollection 8. In this case, an element implicitly means a collection member which is not a collection 1 (a leaf).*/ public Object previous() throws Exception; /*Returns the current element in the collection 1 and moves the iterator backward one position. In case the element is a collection 1, it goes inside that collection 1 and retrieves the last element, until it finds an element which is not a collection 1. When the current collection 1 is exhausted, this iterator will find the previous collection 1 and extract the last element (non-collection) from it. */ public Object at() throws Exception; /*Returns the current element in the collection 1 without moving the iterator position. The returned element is not a collection 1.*/ public boolean setToFirst(); /*Set the iterator to the first element in this federated collection 8. The first element is not a collection 1. Returns true if the operation is successful, otherwise it returns false.*/ public boolean setToLast(); /*Set the iterator to the last element in this federated collection 8. The last element is not a collection 1. Returns true if the operation is successful, otherwise it returns false.*/ public boolean setToNext(); /*Set the iterator to the next element in this federated collection 8. The next element is not a collection 1. Returns true if the operation is successful, otherwise it returns false.*/ public boolean setToPrevious(); /*Set the iterator to the previous element in this federated collection 8. The previous element is not a collection 1. Returns true if the operation is successful, otherwise it returns false.*/ public boolean setToFirstCollection(); /*Set the iterator to the first element in the first collection in this federated collection 8. The first element is not a collection 1. Returns true if the operation is successful, otherwise it returns false.*/ public boolean setToLastCollection(); /*Set the iterator to the last element in the last collection 1 in this federated collection 8. The last element is not a collection 1. Returns true if the operation is successful, otherwise it returns false.*/ public boolean setToNextCollection();/*Set the iterator to the first element in the next collection 1 in this federated collection 8. The first element is not a collection 1. Returns true if the operation is successful, otherwise it returns false.*/ public boolean setToPreviousCollection(); /*Set the iterator to the last element in the previous collection 1 in this federated collection 8. The first element is not a collection 1. Returns true if the operation is successful, otherwise it returns false.*/

6 Object Query classes 6.1 QueryManager

A query manager 10 is a more powerful subclass of query evaluator 11, it can evaluate queries, as well as create query objects 13. It assists query objects 13 in query processing and in monitoring query execution. It functions as described in IBM manual, Digital Library Application Programming Guide and Reference for the Internet Connection, Doc. No. SC26-8868-00.

A more specific version of query manager 10 is Datastore 9, which represents a data storage facility and provides the functionalities of the underlying datastore (i.e. a relational data base, Digital Library, etc). An example of a QueryManager interface is set forth below.

```
QueryManager.java package COM.ibm.mm.sdk.server;
public interface QueryManager extends QueryEvaluator
{
   public abstract Query createQuery(String query,
                                     short  ql_type,
                                     NVPair params []);
};
```

6.2 QueryBase

Querybase 12 is an interface for a query object 13 which can be associated with zero or more datastores 9. With the help of its datastores, query objects 13 perform query processing tasks, such as preparing and executing a query, monitoring the status of query execution, and storing the results. The result of a query is usually a Results object 6. It functions as described in IBM manual, Digital Library Application Programming Guide and Reference for the Internet Connection, Doc. No. SC26-8868-00. A sample QueryBase interface is defined below.

```
QueryBase.java package COM.ibm.mm.sdk.server;
public interface QueryBase
{
   public void    prepare (NVPair params []) throws Exception;
   public void    execute (NVPair params []) throws Exception;
   public int     status ();
   public Object  result ();
};
```

6.3 Query

Query 13 is an interface for a query object associated with one specific datastore. Objects which implement this interface are created by datastore classes 9. The result of a query is usually a Results object 6. Examples of concrete implementations of Query 13 interfaces are ParametricQuery 14, TextQuery 15, ImageQuery 16, etc, which are created by their associated datastore. An example of a Query 13 interface definition is set forth below.

```
Query.java package COM.ibm.mm.sdk.server;
public interface Query extends QueryBase
{
   public short     qlType ();
   public String    queryString ();
   public Datastore datastore ();
};
```

6.4 ParametricQuery

ParametricQuery 14 is a concrete implementation of Query 13, created by a datastore object 9, to represent and execute a query involving parametric data. Parametric queries refer to a class of queries requiring an exact match of the query predicate with the values stored in the datastore 9. They function as described in IBM manual, Digital Library Application Programming Guide and Reference for the Internet Connection, Doc. No. SC26-8868-00. An example of a ParametricQuery class definition is set forth below.

```
ParametricQuery.java package COM.ibm.mm.sdk.server;
public class ParametricQuery implements Query
{
   public ParametricQuery(Datastore creator, String queryString);
   public ParametricQuery(ParametricQuery fromQuery);
   public void prepare(NVPair params []);
   public void execute(NVPair params []);
   public int       status ();
   public Object    result ();
   public short     qlType ();
   public String    queryString ();
   public Datastore datastore ();
};
```

6.5 TextQuery

TextQuery 15 is a concrete implementation of Query 13, created by a datastore object 9, to represent and execute a query involving textual data. Text queries refer to a class of queries on the content of text fields for an approximate match with the given text search expression, i.e. the existence (or non-existence) of certain phrases or word-stems.

The text query object 15 performs the necessary data format conversion internally (e.g. datastream conversion for Text Miner), so the methods relevant to these conversions do not need to be exposed to public. With that exception, a text query object functions as described in IBM manual, Digital Library Application Programming Guide and Reference for the Internet Connection, Doc. No. SC26-8868-00.

---
TextQuery.java
---
```
package COM.ibm.mm.sdk.server;
public class TextQuery implements Query
{
    public TextQuery(Datastore creator, String queryString);
    public TextQuery(TextQuery fromQuery);
    public void prepare(NVPair params []);
    public void execute(NVPair params []);
    public int         status ();
    public Object      result ();
    public short       qlType ();
    public String      queryString ();
    public Datastore   datastore ();
};
```

6.6 ImageQuery

ImageQuery 16 is a concrete implementation of Query 13, created by a datastore object 9, to represent and execute a query involving image data Image queries refer to a class of queries on the visual content of images for an approximate match with the given image search expression, i.e. the existence (or non-existence) of certain color percentages, layout, and textures. An example of an ImageQuery 16 class definition is set forth below.

---
ImageQuery.java
---
```
package COM.ibm.mm.sdk.server;
public class ImageQuery implements Query
{
    public ImageQuery(Datastore creator, String queryString);
    public ImageQuery(ImageQuery fromQuery);
    public void prepare(NVPair params []);
    public void execute(NVPair params []);
    public int         status ();
    public Object      result ();
    public short       qlType ();
    public String      queryString ();
    public Datastore   datastore ();
};
```

6.7 CombinedQuery

CombinedQuery 18 is a concrete implementation of QueryBase 12, to represent and execute a combination of parametric, text, and image queries. Combined queries provide multi-search capability on the specified datastore by coordinating the execution of their subqueries. They function as described in IBM manual, Digital Library Application Programming Guide and Reference for the Internet Connection, Doc. No. SC26-8868-00. An example of a CombinedQuery 18 class definition is set forth below.

---
Combined Query.java
---
```
package COM.ibm.mm.sdk.server;
public class CombinedQuery implements QueryBase
{
    public CombinedQuery( ) ;
    public CombinedQuery(CombinedQuery fromQuery) ;
    public void prepare(NVPair params[ ]) throws Exception;
```

---
-continued

Combined Query.java
---
```
    public void execute(NVPair params[ ]) throws Exception;
    public int     status( ) ;
    public Object  result( ) ;
};
```

6.8 OnDemandQuery

OnDemandQuery (not shown) is a concrete implementation of Query 13, created by a datastore object 9, to represent and execute a query involving parametric data in OnDemand datastores. See also parametric query above. An example of an OnDemandQuery class is set forth below.

---
OnDemandQuery.java
---
```
package COM.ibm.mm.sdk.server;
public class OnDemandQuery implements Query
{
    public OnDemandQuery(Datastore creator, String queryString) ;
    public OnDemandQuery(onDemandQuery fromQuery) ;
    public void prepare(NVPair params[ ]) ;
    public void execute(NVPair params[ ]) ;
    public int         status( ) ;
    public Object      result( ) ;
    public short       qlType( ) ;
    public String      queryString( ) ;
    public Datastore   datastore( ) ;
};
```

6.9 FederatedQuery

A FederatedQuery 19 is a concrete implementation of Query 13 which can be associated with more than one physical datastore. Its purpose is to represent and execute queries across heterogeneous datastores. This query can be a combination of a DL parametric query, OnDemand query, and other query types involving supported datastores.

The FederatedQuery object 19 delegates the query processing task to each of the native datastores or to its associated federated datastore 37. The latter will translate the query into several native queries, one for each of the native datastores, submit them for processing and collect the result back. See 9.6.3 , "Federated query processing" for further details.

The result is a FederatedCollection object 8, a collection of collection objects 1, which in turn contains data objects in a consistent and uniform structure as represented by dynamic data objects, DDOs 28. The federated collection 8 gives the user a choice to process the results regardless of the datastore origin or to process them according to each native datastore where the results came from. See 5.7 , "FederatedCollection". See also 5.11 , "FederatedIterator", 5.9, "Iterator", 5.10 , "SequentialIterator", 9.6 , "DatastoreFederated", and 9.6.2 , "Federated query string". An example of a FederatedQuery 19 class definition is set forth below.

---
FederatedQuery.java
---
```
package COM.ibm.mm.skd.server;
public class FederatedQuery implements Query
{
    public FederatedQuery(Datastore creator, String queryString) ;
    public FederatedQuery(FederatedQuery fromQuery) ;
```

---

FederatedQuery.java

```
    public void prepare(NVPair params[ ]) ;
    public void execute(NVPair params([ ]) ;
    public int          status( ) ;
    public Object       result( ) ;
    public short        qlType( ) ;
    public String       queryString( ) ;
    public Datastore    datastore( ) ;
};
```

7 Data Object classes
7.1 DataObjectBase

DataObjectBase 20 is an abstract base class for data objects, data value objects (UDTs), and extender data objects defined in CDO. These are the objects known by datastores 9.

---

DataObjectBase.java

```
    package COM.ibm.mm.sdk.server;
    public abstract class DataObjectBase
    {
        public abstract short protocol( ) ;
        public abstract String getObjectType( ) ;
    };
```

---

DataObjectBase 20 has a protocol method, which indicates what protocol to use to store and retrieve the persistent data to/from a datastore 9. Objects with the same protocol are handled in a similar manner by the datastore 9. The preferred embodiment supports the DDO, Data value, XDO, PO, and PDDO protocols. Potentially, the data access class library can be extended to support additional subclasses and their associated protocols, for example, stream data objects and protocols.

7.1.1 Methods public abstract shortprotocol(); /*Gets the protocol type associated with this data object.*/ public abstract String getObjectType(); /*Gets the type of this object.*/

7.2 DataObject

DataObject 31 is an abstract class, and a subclass of DataObjectBase 20. DataObject 31 is used to represent objects which can have persistent data. DataObject 31 must be subclassed in order to implement a real object. A subclass of DataObject 31 is DDO 28—dynamic data object.

---

DataObject.java

```
    package COM.ibm.mm.sdk.server;
    public abstract class DataObject extends DataObjectBase
    {
        public DataObject( ) ;
        public Pid getPid( ) ;
        public void  setPid(Pid aPid) ;
    };
```

---

DataObject 31 has a Pid—persistent object identifier. Pid identifies the location of the persistent data of this data object in the datastore. If the Pid is not set, it will be created automatically after the first data manipulation operation. DataObject 31 inherits protocol from its parent DataObject-Base 20, and supports the DDO, PO, and PDDO protocols. Methods public Pid getPid(); Gets the Pid of this DataObject.

public void setPid(Pid apid); Sets the Pid of this DataObject.

7.3 DDO Base—Dynamic Data Object Base

DDO 28 provides a representation and a protocol to define and access object's data, independent of object's type. The DDO 28 protocol is implemented as a set of generic methods to define, add, and access each data items of an object. This protocol allows a client to create an object dynamically and get its persistent data in and out of the datastore, independent of datastore's type. The implementation may utilize schema mapping information, registered in the datastore class. The schema maps each individual persistent data items to its underlying representation in the datastore. A DDO 28 has a set of attributes, each having a type, value, and properties associated with it. The DDO 28 itself may have properties which belong to the whole DDO 28 instead of to a particular attribute. DDO 28 is a subclass of DataObject 31.

---

DDOBase.java

```
package COM.ibm.mm.sdk.server;
public class DDOBase extends DataObject
{
    public DDOBase( );
    public DDOBase(short initialSize);
    public DDOBase(DDOBase ddo);
    public DDOBase(String objectType, short initialSize);
    public DDOBase(Pid pid, short initialSize);
    public short       protocol( );
    public String      getObjectType( );
    public void        setObjectType(String toObjectType);
    public boolean updatable( );
    public short       addData( ) throws Exception;
    public short       addData(String dataName) throws Exception;
    public short       addDataProperty(short data_id,
                         String property_name) throws Exception;
    public short       addDataProperty(short data_id,
                         String property_name, Object property_value)
                         throws Exception;
    public short       dataCount( );
    public short       dataPropertyCount(short data_id) throws Exception;
    public void        setDataProperty(short data_id, short property_id,
                         Object property_value) throws Exception;
    public Object      getDataProperty(short data_id,
                         short property_id) throws Exception;
    public void        setDataPropertyName(short data_id,
                         short property_id, String property_name)
                         throws Exception;
    public String      getDataPropertyName(short data_id,
                         short property_id) throws Exception;
    public void        setData(short data_id, Object data_value)
                         throws Exception;
    public Object      getData(short data_id) throws Exception;
    public void        setDataName(short data_id,
                         String data_name) throws Exception;
    public String      getDataName(short data_id) throws Exception;
    public short       dataId(String data_name) throws Exception;
    public short       dataPropertyId(short data_id,
                         String property_name) throws Exception;
    public void        setNull(short data_id) throws Exception;
    public boolean isNull(short data_id) throws Exception;
    public boolean isDataSet(short data_id) throws Exception;
    public boolean isDataPropertySet(short data_id,
                         short property_id) throws Exception;
    public Object      getDataByName(String data_name)
                         throws Exception;
    public Object      getDataPropertyByName(String data_name,
                         String property_name) throws Exception;
    public Object      getDataPropertyByName(short data_id,
                         String property_name) throws Exception;
    //properties of this DDO
    public short       addProperty( ) throws Exception;
    public short       addProperty(String property_name)
                         throws Exception;
```

-continued

DDOBase.java

```
    public short      addProperty(String property_name,
                        Object property_value) throws Exception;
    public short      propertyCount( ) throws Exception;
    public void       setProperty(short property_id,
                        Object property_value) throws Exception;
    public Object     getProperty(short property_id) throws Exception;
    public void       setPropertyName(short property_id,
                        String property_name) throws Exception;
    public String     getPropertyName(short property_id)
                        throws Exception;
    public short      propertyId(String property_name)
                        throws Exception;
    public Object     getPropertyByName(String property_name)
                        throws Exception;
    public boolean    isPropertySet(short property_id) throws Exception;
};
```

Methods
DDOBase—Constructors public DDOBase(short initialSize);
public DDOBase(DDOBase ddo);
public DDOBase(String objectType, short initialSize);
public DDOBase(Pid pid, short initialSize);
DDOBase(DDODef ddoDej); /*A DDOBase 29 object can be created by calling the constructor with our without supplying any parameter, or by copying information from another DDOBase 29.*/
public short addData() throws Exception;
public short addData(String data_name) throws Exception; /*Adds a new data-item to a DDO 28 and returns the new data-item number (data-id).*/
public short addDataProperty(short data_id) throws Exception;
public short addDataProperty(short data_id, String property_name) throws Exception;
public short addDataProperty(short data_id, String property_name, Object property_value) throws Exception; /*Add a new property to a given data-item and returns the new property number.*/
public short dataCount();/*Gets the number of data-items in this DDO 28*/
public short dataPropertyCount (short data_id) throws Exception; /*Gets the number of properties associated with this data-item.*/
public void setDataProperty (short data_id, property_id, propertyValue) throws Exception; /*Sets the value of a given property in a data-item.*/
public Object getDataProperty (short data_id, property_id) throws Exception; I*Gets the value of a given property in a data-item.*/
public void setDataPropertyName (short data_id, shortproperty_id, String property_name) throws Exception; /*Sets the name of a given property-id in a data-item.*/
public StringgetDataPropertyName(short data_id, short property_id) throws Exception; /*Gets the name of a given property-id in a data-item.*/
public void setData (short data_id, Object dataValue) throws Exception; /*Sets the value of a given data-item.*/
public Object getData (short data_id) throws Exception; /*Gets the value of a given data-item.*/
public void setDataName(short data_id, data_name) throws Exception; /*Sets the name of a given data-item.*/
public String getDataName (short data_id) throws Exception; /*Gets the name of a given data-item.*/
public short dataId (String data_name) throws Exception; /*Gets the data-id of a given data-item name*/
public short dataPropertyId (short data_id, Stringproperty_name) throws Exception; /*Gets the property-id of a given property-name in a data-item.*/
public void setNull(short data_id) throws Exception; /*Sets the value of a data-item to null. The data-item must be nullable and the DDO 28 must be updatable.*/
public boolean isNull(short data_id) throws Exception; /*Returns true if this data-item value is null.*/
public boolean isDataSet (short data_id) throws Exception; /*Returns true if this data-item value is set already.*/
public boolean isDataPropertySet (short data_id, short propertyid) throws Exception; /*Returns true if the given property of a data-item is set.*/
public Object getDataByName (String data_name) throws Exception; /*Gets the value of a data-item, given its name.*/
public Object getDataPropertyByName (String data_name, property_name) throws Exception; Object getDataPropertyByName (short data_id, property_name) throws Exception; /*Gets the value of the given property-name of a data-item.*/
public String getObjectType(); /*Gets the object type of this DDO 28.*/
public void setObjectType(String aObjectType); /*Sets the object type of this DDO 28 and synchronize it with the object type of its Pid.*/
public short addProperty() throws Exception;
public short addProperty(String property_name) throws Exception;
public short addProperty(Stringproperty_name, Object property_value) throws Exception; /*Add a new property to this DDO 28 and returns the new property number.*/
public short propertyCount() throws Exception; /*Gets the number of properties associated with this DDO 28.*/
public void setProperty(short property_id, Object property_value) throws Exception; /*Sets the value of a given property id in this DDO 28.*/
public Object getProperty(shortproperty_id) throws Exception; /*Gets the value of a given property id in this DDO 28.*/
public void setPropertyName(shortproperty_id, String property_name) throws Exception; /*Sets the name of a given property id in this DDO 28.*/
public String getPropertyName(short property_id) throws Exception; /*Gets the name of a given property id in this DDO 28.*/
public short propertyId(String property_name) throws Exception; /*Gets the property-id of a given property-name in this DDO 28.*/
public Object getPropertyByName(String property_name) throws Exception; /*Gets the value of the given property-name of this DDO 28.*/
public boolean isPropertySet(short property_id) throws Exception; /*Returns true if the given property id of this DDO 28 is set.*/

7.4 DDO—Dynamic Data Object

A DDO 28 is a special class of DDOBase 29 that keeps the information about its associated datastore 9 and has CRUD methods (add, retrieve, update, delete). So, with the help of the datastore 9, it can send itself in and out of datastore 9. A datastore query returns a collection of DDOs 28. A sample DDO definition is set forth below.

---
DDO.java
---
```
package COM.ibm.mm.sdk.server;
public class DDO extends DDOBase
{
    public DDO(short initialSize) ;
    public DDO(DDO ddo) ;
    public DDO(String objectType, short initialSize) ;
    public DDO(Datastore ds, String objectType, short initialSize) ;
    public DDO(Pid pid, short initialSize) ;
    public DDO(Datastore ds, Pid pid, short initialSize) ;
    public void setDatastore(Datastore ds) ;
    public Datastore getDatastore( ) ;
    public short protocol( ) ;
    // CRUD methods
    public void add( ) ;
    public void retrieve( ) ;
    public void update( ) ;
    public void del( ) ;
};
```
---

7.4.3 Methods
DDO—Constructors public DDO(short initialSize);

public DDO(DDO ddo);

public DDO(String objectType, short initialSize);

public DDO(Datastore ds, String objectType, short initialSize);

public DDO(Pidpid, short initialSize);

public DDO(Datastore ds, Pidpid, short initialsize); /*DDO 28 can be created by calling the constructor with or without supplying any parameter, or by copying information from another DDO 28.*/ public void setDatastore(Datastore ds);/*Sets this datastore as the one associated with this DDO 28, i.e. the datastore to keep the persistent copy of this DDO 28.*/ public Datastore getDatastore(); /*Gets the associated datastore for this DDO 28.*/ public short protocol(); /*Returns the protocol supported by this object. In this case, it is PDDO, which essentially means that this object knows about the datastore it is associated with and, with the help of the datastore, this object can store itself in and out of the datastore.*/

CRUD methods public void add();

public void retrieve();

public void update();

public void del();

/*Insert, retrieve, update, or delete this object from persistent store. In the preferred embodiment, the add, del, and update operations only affect the object in the persistent store; they do not change the copy in main memory.*/

7.5 Pid

A persistent data identifier (Pid) provides a unique identifier to locate the persistent data of data objects in a set of known datastores. A DataObject 31 needs to have a Pid in order to store its data persistently.

---
Pid.java
---
```
package COM.ibm.mm.sdk.common;
public class Pid
{
    public Pid( ) ;
    public Pid(String sourcePidString) throws Exception;
    public Pid(Pid pid) ;
    public String  getDatastoreType( ) ;
    public void    setDatastoreType(String sourceDatastoreType) ;
    public String  getDatastoreName( ) ;
    public void    setDatastoreName (String sourceDatastoreName) ;
    public String  getId( ) ;
    public void    setId(String sourceId) ;
    public String  pidString( ) ;
    public String  getObjectType( ) ;
    public void    setObjectType(String anObjectType) ;
    public boolean isSet( ) ;
};
```
---

7.5.2 Methods
Pid—Constructors public Pid();

public Pid(String sourcePidString) throws Exception;

public Pid(Pidpid);

sourcePidString is a String obtained as a return value from calling the pidString() method.

public String getDatastoreType(); /*Gets datastore type.*/ public void setDatastoreType (String aDatastoreType); /*Sets the datastore type to the given string value.*/ public String getDatastoreName();/*Gets datastore name.*/ public void setDatastoreName (String aDatastoreName); /*Sets the datastore name to the given string value.*/ public String getId();/*Returns a string consisting of a datastore specific id of this DataObject 31 persistent data. This id contains information to locate the persistent data in the given datastore.*/ public void setId (String sourceId); /*Sets the datastore specific id of the DataObject 31 persistent data to the given string value.*/ public String pidString();/*Returns a string representation of this Pid. This string can be used as an input parameter to re-construct the Pid using its constructor. The string format may vary between datastore types.*/ public String getObjectType();/*Gets the type of the object owning this Pid.*/ public void setObjectType(String anObjectType); /*Sets the type of the object owning this Pid.*/ public boolean isSet();/*Returns true if all components of this Pid are set to their intended values.*/

8 XDO Classes

FIG. 3 shows the Data Object Class hierarchy, which includes the Extended Data Object (XDO 22) classes. The base XDO class is XDOBase 21, a subclass of DataObjectBase 20. The purpose of an XDO class is to represent a user defined data type, i.e. a data value(s) with all the methods relevant to it. A subclass of XDOBase 21 is XDO 22, which provides a public interface to support persistency and may exist as a stand-alone object (without the associated DDO 28). Other subclasses of XDOBase 21 may be defined by users to represent a specific user defined type, such as USDollar or shoe-size. However, only subclasses of XDO 22 have persistency.

A more detailed description of XDO 22 classes and their properties is given in Java Grand Portal Design Notes, Lee et al., Dec. 9, 1997, and Doug Hembry. *Extended Data Objects (XDO) Class Library High Level Specification and Design,* (Aug 7, 1996); IBM's U.S. application Ser. No., 08/852,051, filed May 6, 1997, entitled OBJECT AGGREGATION REPRESENTATION OF RELATIONAL DATABASE ROWS HAVING NONTRADITIONAL DATATYPES, by Daniel T. CHANG, Douglas M. HEMBRY, Basuki N. SOETARMAN, and Robert N. SUMMERS; IBM's U.S. application Ser. No., 08/852,062, filed May 6, 1997, entitled CLASS HIERARCHY FOR OBJECT AGGREGATION REPRESENTATION OF RELATIONAL DATABASE ROWS WITH CELLS HAVING NONTRADITIONAL DATATYPES, by Daniel T. CHANG, Douglas M. HEMBRY, Basuki N. SOETARMAN, and Robert N. SUMMERS; IBM's U.S. application Ser. No., 08/852,055, filed May 6, 1997, entitled FLEXIBLE OBJECT REPRESENTATION OF RELATIONAL DATABASE CELLS HAVING NONTRADITIONAL DATATYPES, by Daniel T. CHANG, Douglas M. HEMBRY, Basuki N. SOETARMAN, and Robert N. SUMMERS; and IBM's U.S. application Ser. No. 08/852,052, filed May 6, 1997, entitled OBJECT REPRESENTATION OF RELATIONAL DATABASE CELLS HAVING NONTRADITIONAL LARGE OBJECT DATATYPES, by Douglas M. HEMBRY, which are herein incorporated by reference. A sample program to illustrate the use of stand-alone XDO 22 is given in Section 12.4, "Example of Add, Retrieve, Update, Delete and Open from XDO object".

8.1 XDOBase

XDOBase is an abstract class, subclass of DataObjectBase, to represent a data value, ranging from a simple UDT (User Defined Type) to a complex LOB (Large Object). XDOBase provides a set of methods specifically used to communicate with Datastore objects. A user should subclass from XDOBase and provide methods that correspond to their specific UDT or LOB behaviors.

8.2 XDO

The XDO 22 is an abstract class that can represent a complex UDT (User Defined Type) or LOB (Large Object). The user should subclass from XDO 22 and provide methods relevant to the UDT or LOB being represented. This user defined XDO 22 subclass can either work with an associated DDO 28 or as a stand alone-object. XDO 22 extends the public interface of XDOBase 21 mainly by defining independent datastore access CRUD functions (add, retrieve, update, del). These functions enable an application to store and retrieve the object's data to and from a datastore without the existence of an associated DDO 28 class object (stand-alone XDO 22). A stand-alone XDO 22 must have its Pid set in order to be able to locate the position in the datastore where it belongs. If the XDO 22 is used in conjunction with the DDO 28 the pid is set automatically. XDO 22 inherits protocol from its parent DataObjectBase 20.

8.3 BLob

Blob 23 is an abstract class that declares a common public interface for basic binary large object (BLOB) data types in and other datastores. The concrete classes derived from Blob 23 share this common interface, allowing polymorphic processing of collections of blob objects originating from heterogeneous datastores. Blob 23 is a subclass of XDO 22 and supports the XDO 22 protocol.

8.4 BlobDL

The BlobDL 25 class is one of the concrete subclass of Blob 23. BlobDL 25 defines the public interface for BLOB parts in DL. It inherits the public interface of Blob 23 (and therefore from XDO 22 and XDOBase 21) and implements any abstract functions present in the interfaces of those base classes.

8.5 CLob

Clob 26 is an abstract class that declares a common public interface for basic character large object (CLOB) data types in Digital Library datastores. The concrete classes derived from Clob 26 share this common interface, allowing polymorphic processing of collections of character clob objects originating from data stored in heterogeneous datastores. In the preferred embodiment, the interface for CLob is the same as that defined for Blob 23. It is expected that over time, the interfaces would diverge, with more binary oriented function being added to the Blob 23 interface, and function suitable for character data being added to Clob 26.

8.6 ClobDL

The ClobDL class is one of the concrete subclass of Clob 26. ClobDL defines a public interface for CLOB parts in DL. It inherits the public interface of Clob 26 (and therefore from XDO 22 and XDOBase 21) and implements any pure virtual functions present in the interfaces of those base classes.

8.7 PidXDO

Persistent data identifier for XDO 22 provides a unique identifier to locate the persistent data of an XDO 22 in a known datastore. An XDO 22 needs to have an PidXDO in order to store its data persistently. PidXDO is a subclass of Pid.

8.8 PidXDODL

PidXDODL is a specific PidXDO for XDOs stored in Digital Library. This class has information on partid where the data comes from.

8.9 Annotation

Annotation represents the digital library annotation information structure(ANNOTATIONSTRUCT). The data structure provides information about an annotation affiliated with an object.

9 Data Access classes 9.1 Datastore

A Datastore 9 object represents and manages a connection to a datastore, transactions, and the execution of datastore commands. Datastore 9 is a special version of query manager class 10. It supports the evaluate method, so it may be considered as a subclass of query manager 10. Datastore 9 should be subclassed to provide a specific implementation of the target datastore. For example:

DatastoreDL

DatastoreTS

DatastoreQBIC

DatastoreOD etc.

---

Datastore.java

```
package COM.ibm.mm.sdk.server;
public interface Datastore extends QueryManager
{
    public void connect   (String datastore_name,
                           String user_name,
                           String authentication,
                           String connect_string) throws Exception;
    public void      disconnect ( ) throws Exception;
    public Object    getOption (int option) throws Exception;
    public void      setOption (int option, Object value)
                       throws Exception;
    public Object    evaluate(String command, short
                       commandLangType, NVPair params[ ]) ;
    public Object    evaluate(Query query) ;
    public Object    evaluate(CQExpr queryExpr) ;
    public ResultSetCursor execute   (String command,
                                      short commandLangType,
```

Datastore.java

```
                         NVPair params[ ])
                              throws Exception;
public ResultSetCursor execute (Query query)
                              throws Exception;
public ResultSetCursor execute (CQExpr queryExpr)
                              throws Exception;
public Query createQuery (String command,
                         short commandLangType,
                         NVPair params [ ])
                              throws Exception;
public Query createQuery (CQExpr queryExpr) throws Exception;
public void addObject( DataObject ddo )     throws Exception;
public void deleteObject( DataObject ddo )  throws Exception;
public void retrieveObject( DataObject ddo ) throws Exception;
public void updateObject( DataObject ddo )  throws Exception;
public Object listServers( )   throws Exception;
public Object listEntity( )    throws Exception;
public Object listEntityAttributes (String entityName)
           throws UsageError, DatastoreAccessError;
public void commit ( ) throws Exception;
public void rollback ( ) throws Exception;
public boolean  isConnected ( ) ;
public String   datastoreName( ) ;
public String   datastoreType( ) ;
public Handle connection( ) ;
public String   userName( ) ;
};
```

9.1.2 Methods public void connect (String datastore_name, String userName, authentication, connect_string) throws Exception; /*Connects to the datastore. Authentication is the password, and datastore_name is the name of the database or library server.*/ public void disconnect () throws Exception; /*Disconnects from the datastore.*/ public void setOption (int option, Object value) throws Exception; /*Sets a datastore option.*/

The valid options and values are as follows:

| | Option Value | Description |
|---|---|---|
| OPT_ACCESS_MODE | | (for DatastoreDL and TS) |
| | READONLY | Indicates that this connection supports read-only access to the datastore |
| | READWRITE | Indicates that this connection supports read and write access to the datastore |
| OPT_TYPE_CONVERSION | | (for DatastoreDL and TS) |
| | TRUE | Indicates that base types from a datastore are to be returned in a retrieved DDO. |
| | FALSE | Indicates that base types from a datastore are converted to strings in a retrieved DDO. |
| OPT_DL_WAKEUPSRV | TRUE | Notify the search program that there is indexing work to be done for each XDO. |
| | FALSE | Notify the search program that there is indexing work to be done. |
| OPT_FORCE_UPDATE | TRUE | If XDO has not changed an update will be performed. |
| | FALSE | If XDO has not changed an update will not be performed. |
| OPT_DL_ACCESS | | Indicates the type of access to DL requested |
| | SS_CONFIG | Indicates that the current access is an administrative session |
| | SS_NORMAL | Indicates that the current access is a non-configuration session and prohibits the same userid from logging in to the datastore multiple times |
| OPT_TS_CCSID | | (TS only) Indicates the type of coded character set identifier. See IBM manual, Digital Library Application Programming Reference Volume 2: Text Search Server, Doc. No. SC26-8653-00, for the details |
| OPT_TS_LANG | | (TS only) Indicates the type of language identifier. See IBM manual, Digital Library Application Programming Reference Volume 2: Text Search Server, Doc. No. SC26-8653-00, for the details |
| OPT_TRANSACTION_STATE | | (for DatastoreDL) |
| | ACTIVE | Indicates that a user is in a transaction. |
| | INACTIVE | Indicates that a user is not in a transaction. | public Object getOption (int option) throws Exception; /*Gets the datastore option. The valid options and values for getting options are the same as for setting options.*/ public Object evaluate(String command, short commandLangType, params[]); public Object evaluate (Query query); public Object evaluate(CQExpr queryExpr); /*Evaluates a query and returns the result as a Object containing QueryableCollection 5. The second form takes a query object. The third form takes a compound query expression as an alternate form of a query string.*/ public ResultSetCursor execute(String command, short commandLangType, params[]) throws Exception; public ResultSetCursor execute (Query query) throws Exception; public ResultSetCursor execute(CQExpr queryExpr) throws Exception; /*Executes a command to the datastore and returns a result set cursor. The second form takes a query object, and the third form takes a compound query expression.*/

```
public Query createQuery (String command,
   commandLangType, params[]); public Query create-
   Query (CQExpr queryExpr); /*Creates a query object
   using the given parameters. The second form takes a
   compound query expression as an alternate form of a
   query string.*/
public void addObject (DataObject do) throws Exception;
   /*Adds the data object to the datastore.*/
public void deleteObject (DataObject do) throws Excep-
   tion; /*Deletes the data object from the datastore.*/
public void retrieveObject (Data Object do) throws
   Exception; /*Retrieve the data object from the
   datastore.*/
public void updateObject (DataObject do) throws Excep-
   tion; /*Updates the datastore with this data object.*/
public Object listServers() throws Exception; /*Returns a
   list of valid servers to connect to. The return value is a
   sequential collection containing objects describing the
   server. The object will be specific for each datastore.*/
public Object listEntity() throws Exception; /*Returns a
   list of entity names accessible in the current server. An
   entity corresponds to an index-class in DL or a table in
   a relational database system. A user establishes a con-
   nection to the server before calling this method. The
   return value is a sequential collection containing the
   entity information that is specific for each datastore.*/
public Object listEntityAttributes(String entityName)
   throws UsageError, DatastoreAccessError; /*Returns a
   list of attribute information for a given entity. Please
   refer to the information under the specific datastore
   implementation.*/
public void commit () throws Exception; /*Commits the
   current transaction.*/
public void rollback () throws Exception; /*Rolls back the
   current transaction.*/
public boolean isConnected(); /*Returns true if it is
   connected to datastore.*/
public String datastoreName(); /*Gets datastore name.*/
public String datastoreType(); /*Gets datastore type.*/
public Handle connections; /*Returns the connection
   handle of this datastore.*/
public String userName(); /*Returns the user name of this
   datastore.*/
```

9.2 DatastoreDL

This class is a specific version of Datastore 9 to implement a Digital Library (DL) datastore. It provides Documents, Parts 4 and Folders 31 storage and retrieval mechanisms, as well as query, search, and other document processing features supported by DL. The execute and evaluate methods of DatastoreDL take parametric query strings expressed in the parametric query language type. The syntax of this query string is described below. The ParametricQuery object 14 accepts queries in this syntax; in fact the ParametricQuery 14 object delegates the low level query processing tasks to the DatastoreDL.

By itself, DL only supports parametric queries. Integration with other search engines, such as SearchManager/TextMiner, or QBIC, gives DL the capability to index texts and images, and collectively process combined queries. Combined query processing is done by the CombinedQuery 18 class with the help of the associated datastore classes (DatastoreDL, TS, QBIC, etc). In addition to the functions described in Datastore 9, DatastoreDL provides some other functions for accessing catalogs.

---

DatastoreDL.java

---

```
package COM.ibm.mm.sdk.server;
public class DatastoreDL implements Datastore
{
    . . .
    . . .
    public DatastoreDL ( )
       throws Exception;
    public void connect   ( String datastore_name,
                            String user_name,
                            String authentication,
                            String connect_string) throws Exception;
    public void startTransaction ( ) throws Exception;
    public void wakeUpService(String serviceName) throws Exception;
    public Handle transactionConnection( ) throws Exception;
    public Object listServers( ) throws Exception;
    public Object listEntity( ) throws UsageError;
    public Object listEntityAttributes (String entityName)
                            throws UsageError, DatastoreAccessError;
    public void checkout(DataObject dob)
                            throws UsageError, DatastoreAccessError;
    public void checkIn(DataObject dob)
                            throws UsageError, DatastoreAccessError;
};
```

---

9.2.1 Methods

```
public void connect (String datastore_name, userName,
   authentication, connect_string) throws Exception;
   /*Connects to the datastore. Authentication is the pass-
   word and datastore_name is the name of the library
   server. The connect string is optional. It is used to
   change the password. To change the password of a
   userid, the user must set the DatastoreDL option OPT_
   DL_ACCESS to SS_CONFIG and pass in a connect
   string with the new password.*/
```
Below is sample of the connect string a user can supply.

---

Connect String

NPWD=NEWPASSWORD

---

```
public void startTransaction() throws Exception; /*Start a
   transaction. The user can user commit or rollback
   methods to end the transaction.*/
public Handle transactionConnection() throws Exception;
   /*Returns the transaction connection handle of this
   datastore.*/
public void wakeUpService(String serviceName) throws
   Exception; /*Notify the search program that there is
   indexing work to be done.*/
public Object listServers() throws Exception; /*Returns a
   list of valid servers to connect to. The return value is a
   sequential collection containing ServerInfoDL objects
   describing the server.*/
public class ServerInfoDL
{
    public String serverName();
    public String serverType();
};
   /*The user needs to cast the returned object to Sequen-
   tialCollection 2 and iterate over it to get ServerInfoDL
   objects.*/
public Object listEntity() throws UsageError; /*Returns a
   list of index class names in the current DL server. The
``` user needs to establish a connection to the server before calling this method. The return value is a sequential collection containing string objects, which are index class names. The user needs to cast the returned object to SequentialCollection 2 and iterate over it to get index class names.*/ public Object listEntityAttributes(String entityName) UsageError, DatastoreAccessError; /*Returns a list of attribute information for a given index class name. The input entityName is the name of the desired index class. The user needs to establish a connection to the server before calling this method. The return value is a sequential collection containing AttributeDef objects, each of which describes attribute information. The user needs to cast the returned object to SequentialCollection 2 and iterate over it to get AttributeDef.*/ public void checkOut(DataObject dob) throws UsageError, DatastoreAccessError; /*Checks out a document or folder item from the datastore. The user will have an exclusive update privilege of the item until he/she checks the item back in. However, other users can still read the item.*/ public void checkIn(DataObject dob) UsageError, DatastoreAccessError; /*Checks in a document or folder item previously checked out from the datastore. The user releases his exclusive update privilege of the item.*/

9.2.2 DL parametric query string

The syntax of DL parametric query string is as follows:

---

DL Parametric Query Syntax

SEARCH=([INDEX_CLASS=index_class_name,]
        [MAX_RESULTS=maximum_results,]
        [COND=(expression)]
        [; . . . ]
    );
[OPTION=([CONTENT=yes_no,]
        [TYPE_QUERY=type_of_query,]
        [TYPE FILTER=doc_and_or_folder]
    )]

---

In the above syntax, words in uppercase are keywords. Lowercase words are parameters supplied by users, and are described below:

index_class name—the name of the index class to be searched. If it is not specified, all available index classes will be searched.

maximum_results—the maximum number of results to be returned. If MAX_RESULTS is 0 or not specified, all items that match the search criteria will be returned.

expression—is a conditional expression composed of attribute_name and attribute_value pairs joined with relational operators, and two subsequent pairs are connected with logical operators. Each pair is enclosed in parenthesis. If a condition is not specified, an index class must be specified and it will return all contents in the index class up to the maximum result. (Similar to SELECT * in relational databases).

Logical operators include NOT or , AND or &, and OR or |. Relational operators include EQ or=, LEQ or <=, GEQ or >=, LT or <, GT or >, NEQ or <>, IN, NOTIN, LIKE, NOTLIKE, BETWEEN, and NOTBETWEEN. These last two operators take a pair of attribute values as a range.

An example of a conditional expression is:

(DLSEARCH_Date >= "1990") AND (DLSEARCH_Date <="1993") AND (DLSEARCH_Volume BETWEEN 1 3)

For information about supported operators and examples of valid expressions refer to the LIBSEARCHCRITERIA-STRUCT section of the IBM Manual, Digital Library Application Programming Reference Volume I, Doc. No. SC26–8652-00.

The sequence of INDEX_CLASS, MAX_RESULTS, and COND is terminated by a semicolon and can be repeated for other index classes.

yes_no—YES or NO. If the content is YES, the resulting documents and folders will have their contents retrieved. If the value is NO, only the document or folder ids are set. The default is YES if not specified.

For example, content value YES would cause the resulting document or folder DDOs to have their Pid, object type, properties and all attributes set. If the content is NO, the attributes of the resulting DDOs are not set. Regardless of the content option, the Parts 4 attribute of a document is always set to a collection of parts with NO content. Similarly, the Folder 3 attribute is also set to a collection of DDOs with NO content. The part or DDO 28 content can be retrieved explicitly when needed.

--- type_of_query - the valid values are:
| | |
|---|---|
| STATIC | process the request using static SQL query. If no static query is available the function uses a dynamic query. |
| DYNAMIC | process request using a dynamic SQL query. |
| BUILDONLY | generates a static SQL query based on the input search expressions and saves it for future searches. |
| doc_and_or_folder | takes the value of FOLDERDOC, to search for folders and documents, DOC to search for documents only, and FOLDER to search for folders only. |

---

9.3 DatastoreTS

This class is a specific version of Datastore 9 to implement Text Search (TS) datastore or Text Miner. Essentially, TS provides text indexing and search mechanisms. It does not really store documents or folders. TS indexes text parts of documents and process search requests using this index. The results of a text query submitted to TS are DL item identifiers, which are keys to retrieve the actual documents from DL datastore.

The execute() and evaluate() methods of DatastoreTS take text query strings expressed in text query language type. The syntax of this query string is described below. TextQuery 15 object accepts queries in this syntax, in fact TextQuery 15 object delegates the low level query processing tasks to DatastoreTS.

---

DatastoreTS.java

```
package COM.ibm.mm.sdk.server;
public class DatastoreTS implements Datastore
{
    . . .
    . . .
    public DatastoreTS ( ) throws Exception;
    public void connect   ( String datastore_name,
                            String user_name,
                            String authentication,
                            String connect_string) throws Exception;
    public void connect   ( String server_name,
                            String port,
                            char communication_type) throws Exception;
```

-continued

DatastoreTS.java

```
  public Object listServers( ) throws Exception;
  public Object listEntity( ) throws UsageError;
};
```

9.3.1 Methods public void connect (String datastore_name,
 String userName,
 String authentication,
 String connect_string) throws Exception;

Connects to the datastore. Authentication is the password. The username and authentication are for a digital library server. Datastore 9 name is the name of the search service. The connect string is optional. It is used to provide the communication type and port number as well as a list of library server, userid, authentication groupings. Below is a sample syntax of a connect string a user can supply.

Connect String

[COMMTYPE={T | P};PORT=portnumber;
LIBACCESS=(libraryserver,userid,auth; . . . )]

connect string /*addition connect parameters*/
COMMTYPE /*communication type. This can be set to T (TCPIP) or P (PIPES)*/
PORT /*port number. This parameter must be include if the COMMTYPE is specified.*/
LIBACCESS /*Library access group. If this parameter is passed the user should not specify the userName and authentication parameters in the connect method. Each library access group is related to a digital library server. If one library access group is specified the parenthesis are not needed. The user can specify one or more library access groups. Each library access group consist of the library server name (i.e. LIBSRVR2), userid and authentication of a digital library server which is where the text parts are stored.*/

There are different ways to use the connect method. Below is a list of the different ways to connect to Text Search.

connect with datastore name (search service)
  connect with datastore_name (text search server) and specify connect_string with COMMTYPE and PORT.
  connect with datastore_name (search service), and specify the connect_string with LIBACCESS.
  connect with datastore_name (text search server) and specify connect_string with COMMTYPE, PORT and LIBACCESS.
  connect with datastore_name (search service) and userName, authentication.
  public void connect (String server_name,
   String port,
   char communication_type) throws Exception;
  /*Connects to the datastore. The server_name is the text search server. The user needs to specify the communication type _CTYP_TCPIP—TCPIP or CTYP_PIPES—PIPES) and port number.*/
  public Object listServers() throws Exception; /*Returns a list of valid servers to connect to. The return value is a sequential collection containing ServerInfoTS objects describing the server.*/
  public class ServerInfoTS
  {
    public String serverName();
    public char serverLocation();
  };
  /*The user needs to cast the returned object to SequentialCollection 2 and iterate over it to get ServerInfoTS objects.*/
   serverLocation will return either (_SRV_LOCAL (local server) or SRV_REMOTE (remote server)).
  public Object listEntity() throws UsageError; Returns a list of search index names in the current TS server. The user needs to establish a connection to the server before calling this method.
  public class IndexTS
  {
    public String indexName();
    public String libraryId();
  };
  /*The indexName is the search index name and the libraryId is the library identifier of the search index. The return value is a sequential collection containing IndexTS objects. The user needs to cast the returned object to SequentialCollection 2 and iterate over it to get IndexTS objects.*/

9.3.2 TS text query string

The syntax of text query string is as follows:

TS Text Query Syntax

SEARCH=(COND=(text_search_expression)
 );
[OPTION=([SEARCH_INDEX={search_index_name | (index_list) };]
 [MAX_RESULTS=maximum_results;]
 [TIME_LIMIT=time limit;]
 [THES_NAME=thesaurus_index_name;]
 [THES_DEPTH=depth_for_query_expansion;]
 )]

In the above syntax, words in uppercase are keywords. Lowercase words are parameters supplied by users, and are described below:

text_search_expression /*an expression composed of a sequence of text_search_criteria connected by logical operators.*/
  [unary_operator] text_search_criteria
  [[binary_operator text_search_criteria] . . . ]
  /*Binary operators are AND or &, OR or |, NAND and NOR. NOT is the only unary operator.*/
  text_search_criteria is:
    {search_argument
    $DOC$ '{'search_argument '}'|
    $PARA$ '{'search_argument '}'|
    $SENT$ '{'search_argument '}'
  }
  /*The dollar sign delimits the keyword/option.*/

| | |
|---|---|
| $DOC$ | reserved word indicating that the search proximity expression in search argument has a scope of the whole document |
| $PARA$ | indicating that the search proximity expression in search |

-continued

| | |
|---|---|
| $SENT$ | argument has a scope of a paragraph indicating that the search proximity expression in search argument has a scope of a sentence | search_argument is:
  {[$search_option$] {word/phrase}|
  [$search_option$] '{'free_text'}'
  }...
  /*The dollar sign delimits search_option. Options inside a pair of dollar sign are separated by comma, and can have the following values:*/

| | |
|---|---|
| SYN | search includes synonyms of the current term |
| L | search terms are reduced to its their form (PREC_LEMMA_FORMS). |
| V | less precise matches are also considered as valid (PREC_VARY_PHRASE). |
| P | words in the current term must exactly match the words in the document text (PREC_PRECISE) |
| E | the term precision should be as exact as possible for the current index (PREC_EXACT) |
| MC=symbol | symbol to indicate a sequence of optional characters or for a single optional word, i.e. wild card character, usually an asterisk (*). |
| SC=symbol | symbol to indicate a single required character, usually a question mark (?). word is a word in the specified search language, phrase is quoted words, and free_text is words inside a pair of braces {}. |
| search_index_name | the name of one search index to be searched |
| index_list | the list of search index names to be searched, separated by commas |
| maximum_results | the desired maximum number of results to be returned |
| time_limit | specifies the maximum processing time of the text search server for a Boolean query or the Boolean part of a hybrid query. |

An example of a text search expression to search for documents contains the word "internet" and "DB2" in the same paragraph, and a free text "internet commerce is booming", and a word started with "Net", is as follows:
  $PARA$ {internet DB2} AND
  {internet commerce is booming} AND
  $MC=*$ Net*
For more information about this terminology please refer to IBM Manual, Application Programming Reference Volume 2, Text Search Server, Doc. No. SC26-8653-00.

9.4 DatastoreQBIC

This class is a specific version of Datastore 9 to implement the Query By Image Content (QBIC) datastore. QBIC provides image indexing and search mechanisms for Digital Library data. However, QBIC itself does not store any image data. QBIC indexes image parts in documents and process search requests using this index. The results of an image query submitted to QBIC are DL item identifiers, which are keys to retrieve the actual documents and their parts from a DL datastore.

Since DatastoreFederated 37 implements the Datastore 9 interface, the user can use this same interface for accessing other datastores, such as DatastoreDL, DatastoreOD, etc. From this interface level, DatastoreFederated 37 is consistent with other datastores.

The execute() and evaluate() methods of DatastoreQBIC takes image query strings expressed in QBIC image query language. ImageQuery 16 object accepts queries in this syntax. A sample DatastoreQBIC is defined below.

| DatastoreQBIC.java |
|---|
| package COM.ibm.mm.sdk.server;<br>public class DatastoreQBIC implements Datastore<br>{<br>    public DatastoreQBIC () throws Exception;<br>    public void connect  String datastore_name,<br>                              String user_name,<br>                              String password,<br>                              String connect_string) throws Exception;<br>    ...<br>    ...<br>    public Object listServers()    throws Exception;<br>    public Object listEntity()     throws UsageError;<br>}; |

9.5 DatastoreOD

This class is a specific version of Datastore 9 to implement the OnDemand datastore. OnDemand provides facilities to store, manage, query, and retrieve documents which contain multi-media data. The execute() and evaluate() methods of DatastoreOD take query strings expressed in OnDemand query language. OnDemandQuery object accepts queries in this syntax. A sample DatastoreOD is defined below.

| DatastoreOD.java |
|---|
| package COM.ibm.mm.sdk.server;<br>public class DatastoreOD implements Datastore<br>{<br>    public DatastoreOD () throws Exception;<br>    public void connect  (String datastore_name,<br>                              String user_name,<br>                              String password,<br>                              String connect_string) throws Exception;<br>    ...<br>    ...<br>    public Object listServers()    throws Exception;<br>    public Object listEntity()     throws UsageError;<br>}; |

The syntax of OnDemand query string is similar to DL parametric query string:

| OnDemand Query Syntax |
|---|
| SEARCH= ([FOLDER_NAME=od_folder_name,]<br>         [MAX_RESULTS=maximum_results,]<br>         [COND=(conditional_expression)]<br>         [; ...]<br>       ) ;<br>[OPTION= ([APPENDHIT=yes_no,]<br>         [ORCRITERIA=yes_no]<br>       ) ] |

9.6 DatastoreFederated

This class is a specific version of Datastore 9 to implement the federated datastore 37. A federated datastore 37 is a virtual datastore which combines several heterogeneous datastores 9 into a consistent and unified conceptual view. This view, or a federated schema, is established via schema mapping of the underlying datastores. The users interact with a federated datastore 37 using the federated schema, without needing to know about the individual datastores which participate in the federated datastore 37.

Figure 9:
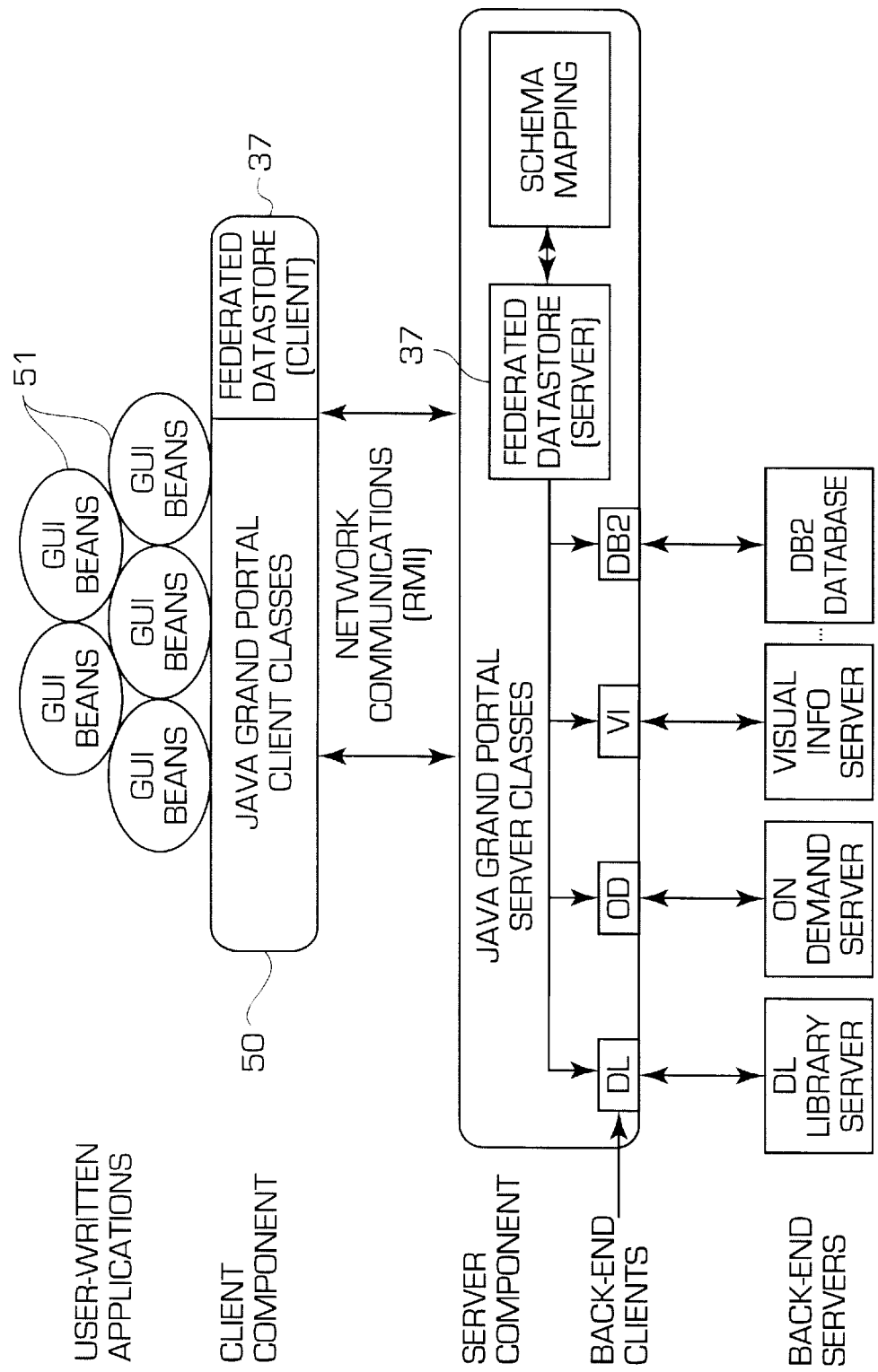
FIG. 9 shows the architecture of a federated search for content management according to an embodiment of the present invention.

FIG. 9 is an architectural diagram outlining the structure of the federated search for Digital Library repositories using the federated datastore 37. The federated datastore 37 does not have a corresponding back-end client. Since it is a virtual datastore, it relies on the underlying physical back-end client associated with it, such as the DL client, OnDemand, VisualInfo, etc. As mentioned before, this association is established by a schema mapping component. See 10, "Schema Mapping" for the description of the schema mapping component. See also 9.6.3, "Federated query processing" for the description of the query processing mechanism.

The communication between the federated datastore 37 client and server can be done by any appropriate protocol and is not an object of the present invention. On top of Java Grand Portal client classes 50, the users can develop application programs using any existing Java Beans 51 development environment, for example.

The federated datastore 37 coordinates query evaluation, data-access, and transaction processing of the participating datastores. Given the federated schema, a multi-search query can be formulated, executed, and coordinated to produce results in the form of a datastore-neutral dynamic data object. See also 9.6.2, "Federated query string" and 5.7, "FederatedCollection". Since DatastoreFederated 37 is a subclass of Datastore 9, its interface is the same as the interface of other datastores, e.g. DatastoreDL, etc. Therefore, a user would be able to access DatastoreFederated 37 and other datastores in a consistent and uniform manner. With respect to the notion of "federation", each participating datastore preserves the right to maintain its "personality", i.e. its own query language, data-model or schema, method of interaction, etc, and at the same time cooperating in a federation to provide a federated schema. This design allows the users to preserve the natural view to their favorite datastore as well as access them in conjunction with other datastores in a federated context.

The federated datastore 37 can combine the participating native datastores in two ways:

with mapping As described above, mapping of concepts across participating datastores is established to provide a unified conceptual view. Based on this federated schema, federated queries with both join and union expressions can be formulated.

without mapping In this case, the federated datastore 37 only reflects the union of each participating datastore's conceptual view. Although it coordinates query processing and data-access for each underlying datastore, the federated datastore 37 must accept queries in each datastore's native language since the query translation process can not be performed without mapping. In addition, since there is no conceptual mapping between datastores, the FederatedQuery 19 results can only reflect the union of results from each datastore.

In the preferred embodiment, the execute() and evaluate() methods of DatastoreFederated 37 take query strings expressed in a federated query language, as does FederatedQuery object 19. An example class definition for DatastoreFederated 37 is set forth below.

```
DatastoreFederated.java
```
```
package COM.ibm.mm.sdk.server;
public class DatastoreFederated implements Datastore
{
  public DatastoreFederated() throws Exception;
```

```
DatastoreFederated.java
```
```
  public void connect  (String datastore_name,
                        String user_name,
                        String password,
                        String connect_string) throws Exception;
  public void  disconnect() throws Exception;
  ...
  ...
  public Object evaluate(String command, short commandLangType,
                         NVPair params []);
  public Object evaluate(Query query);
  public Object evaluate(CQExpr queryExpr);
  public ResultSetCursor execute (String command, short
                         commandLangType,
                         NVPair params []) throws Exception;
  public ResultSetCursor execute (Query query)       throws
                                                     Exception;
  public ResultSetCursor execute (CQExpr queryExpr)  throws
                                                     Exception;
  ...
  ...
  public Query createQuery (String command,
                         short commandLangType,
                         NVPair params []) throws Exception;
  public Query createQuery (CQExpr queryExpr);
  ...
  ...
  public Object listServers()    throws Exception;
  public Object listEntity()     throws UsageError;
  public Object listEntityAttributes(String entityName)
                         throws UsageError, DatastoreAccessError;
};
```

9.6.1 Methods public void connect (String datastore_name,
String userName,
String password,
String connect_string) throws Exception;

Connects to the datastore. The datastore_name is the name of the federated datastore 37, as represented by its federated schema The userName and password is the common login user-name and password. The connect string is optional.

public Object evaluate(String command,
short commandLangType,
NVPair params[]);

public Object evaluate(Query query);

public Object evaluate(CQExpr queryExpr);

Evaluates a query and returns the result as an Object which is a federated collection 8. The second form takes a query object. The third form takes a compound query expression as an alternate form of a query string. The processing of the query involves decomposing, translating, and filtering the FederatedQuery 19 into each native query to be sent to the underlying native datastore. The result from each native datastore will be converted, filtered and merged into a federated collection 8 and returned to the user. See 9.6.3 , "Federated query processing" for the description of the query processing mechanism.

public ResultSetCursor execute(String command, short
commandLangType,
NVPairparams[]) throws Exception;

public ResultSetCursor execute(Query query) throws Exception;

public ResultSetCursor execute(CQExpr queryExpr) throws Exception;

Executes a command to the datastore 9 and returns a result set cursor. The second form takes a query object, and the third form takes a compound query expression.

```
public Query createQuery (String command,
    short commandLangType,
    NVPairparams[]) throws Exception;
public Query createQuery (CQExpr queryExpr);
```
Creates a FederatedQuery 19 object using the given parameters. The second form takes a compound query expression as an alternate form of a query string. public Object listServers() throws Exception;

Returns a list of valid federated servers to connect to. The federated server is actually represented by its federated schema. The return value is a sequential collection containing ServerInfo objects describing the server. The user should cast the returned object to SequentialCollection 2 and iterate over it to get ServerInfo objects.

```
public Object listEntity() throws UsageError;
```

Returns a list of entity names in the current federated schema server. Each entity is mapped to a DL index-class, or a relational database table, etc, depending on the underlying native datastore associated with this federated datastore 37. The user needs to establish a connection to the server before calling this method.

```
public Object listEntityAttributes(String entityName)
    throws UsageError, DatastoreAccessError;
```

Returns a list of attribute information for a given entity. The input entityName is the name of the desired entity. The user needs to establish a connection to the server before calling this method. The return value is a sequential collection containing AttributeDef objects, each of which describes attribute information. See section 11.11 , "AttributeDef". The user should cast the returned object to SequentialCollection 2 and iterate over it to get AttributeDef.

9.6.2 Federated query string

The syntax of FederatedQuery 19 string is similar to the DL parametric query string:

| Federated Query Syntax |
|---|
| PARAMETRIC_SEARCH= ([ENTITY=entity_name,] [MAX_RESULTS=maximum_results,] [COND=(conditional_expression)] [; . . .] ); [OPTION= ([CONTENT=yes_no] )] [and_or TEXT_SEARCH= (COND=(text_search_expression) ); [OPTION= ([SEARCH_INDEX={search_index_name \| (index_list) }; ] [MAX_RESULTS=maximum_results;] [TIME_LIMIT=time_limit] )] ] [and_or IMAGE_SEARCH= (COND=(image_search_expression) ); [OPTION= ([SEARCH_INDEX={search_index_name \| (index_list) }; ] [MAX_RESULTS=maximum_results;] [TIME_LIMIT=time_limit] )] ] |

9.6.3 Federated query processing

Figure 10:
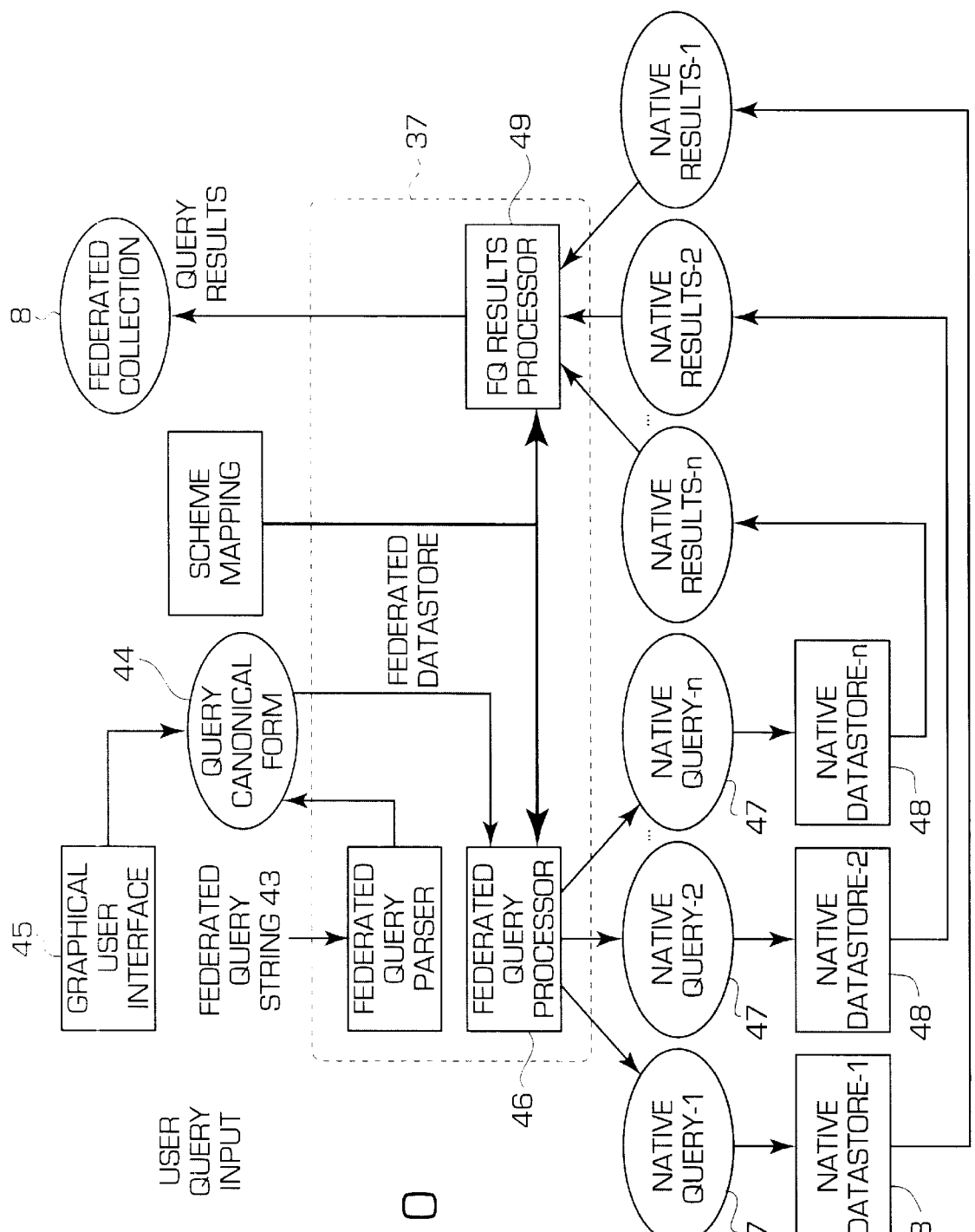
FIG. 10 is a diagram of federated query processing according to an embodiment of the present invention.

As shown in FIG. 10, there are several mechanisms for the users to submit federated queries for execution. The users can create a federated query string 43 and pass it to a federated query object, FederatedQuery 19 (FIG. 2), then invoke the execute 41 or evaluate 39 method (FIGS. 4 and 5) on that object to trigger the query processing.

Alternatively, the user can pass the federated query string 43 to the execute 41 or evaluate 39 method in the federated datastore 37 to process the query directly. The query string will be parsed into afederated query canonical form 44, which is essentially a datastore neutral representation of the query. In case the input query comes from a graphical user interface (GUI) based application 45, the query does not need to be parsed and the corresponding canonical form 44 can be directly constructed.

The query canonical form 44 is the input for the federated query processor module 46.

This module will perform the following tasks:

Query translation. Translates the query canonical form into several native queries 47 that corresponds to each native datastore 48 associated to this federated datastore 37. The translation information is obtained from the schema mapping.

Data conversion. Converts data in the query into a native data type for each of the associated native datastores 48. This process uses the mapping and conversion mechanisms described in the schema mapping.

Data filtering. Filters only the relevant data during the construction of native queries 47.

Each native query 47 is submitted to the corresponding native datastore 48 for execution. When the results come back, they will be received by the federated query results processor module 49, which will do the following:

Data conversion. Converts data from the native type into a federated type according to the mapping information.

Data filtering. Filters the results to include only the requested data.

Result merging. Merges the results from several native datastores into a federated collection.

The end-result is a federated collection 8. The user can create a federated iterator 38 on this collection to iterate over the collection members to process the results. Each call to the method next() in the federated iterator 38 will return a DDO 28, which is self a describing, datastore neutral, dynamic data object.

Recall that the federated collection 8 provides the facility to separate the query results according to the source native datastores. To do such a processing, the user/application should create a sequential iterator by invoking the method createMemberIterator() in the federated collection 8. Using this sequential iterator, the user can pull each member collection, which is a Results object 6, and process it separately. Each Results object 6 corresponds to the results from a native datastore.

9.7 ResultSetCursor

ResultSet Cursor 7 is a datastore cursor which manages a virtual collection of DDOs 28. The collection is a result set of a query submitted to the datastore. Each element of the collection does not materialize until a datastore fetch operation is executed. ResultSetCursor 7 is an interface which needs a specific implementation for the target datastore. For example:

ResultSetCursorDL

ResultSetCursorTS

ResultSetCursorQBIC etc.

In order to use the addObject, deleteObject and updateObject methods a user must set the datastore option OPT_ACCESS_MODE to READWRITE.

```
ResultSetCursor.java
package COM.ibm.mm.sdk.server;
public interface ResultSetCursor
{
   public boolean isScrollable() throws Exception;
   public boolean isUpdatable() throws Exception;
   public boolean isValid();
   public boolean isBegin() throws Exception;
   public boolean isEnd()   throws Exception;
   public boolean isInBetween() throws Exception;
   public int getPosition()    throws Exception;
   public void setPosition(int position, Object value) throws Exception;
   public void setToNext() throws Exception;
   public DDO fetchObject() throws Exception;
   public DDO fetchNext() throws Exception;
   public boolean fetchNextN(int how_many, Collection collection)
throws Exception;
public DDO findObject(int position, String predicate) throws Exception;
   public void     deleteObject() throws Exception;
   public void     updateObject(DDO ddo ) throws Exception;
   public DDO  newObject() throws Exception;
   public void     addObject(DDO ddo) throws Exception;
   public void     open() throws Exception;
   public void     close() throws Exception;
   public boolean isOpen();
   public void destroy();
};
```

9.7.2 Methods

ResultsetCursor is created by Datastore.execute() method, there is no public constructor.

public boolean isScrollable(); /*Returns true if this cursor is scrollable forward and backward. The default is non-scrollable.*/ public boolean isUpdatable(); /*Returns true if this cursor is updatable.*/ public boolean isValid(); /*Returns true if the cursor is valid.*/ public boolean isBegin() throws Exception; /*Returns true if cursor is positioned at the beginning.*/ public boolean isEnd() throws Exception; /*Returns true if cursor is positioned at the end.*/ public boolean isInBetween() throws Exception; /*Returns true if cursor is positioned in between data objects in the result set. It is not at the beginning, at end, or pointing to a data object in the result set.*/ public int getPosition() throws Exception; /*Gets the current position of the cursor.*/ public void setPosition (int position, Object value) throws Exception; /*Sets cursor to the given position.*/
The valid positions are:
ABSOLUTE—absolute position in the result set
BEGIN—the beginning of the result set
END—the end of the result set
FIRST—the first data object in the result set
LAST—the last data object in the result set
NEXT—the next data object from the current position
PREVIOUS—the previous data object from the current position
RELATIVE—relative position in the result set from the current position If a position is ABSOLUTE or RELATIVE, the value specifies the absolute or relative position value. For a non-scrollable cursor, the valid positions are only NEXT and RELATIVE in a positive direction. Currently, the value parameter is an object of type Long.

public void setToNext() throws Exception; /*Sets the cursor to point to the position of the next data object in the result set.*/ public DDO fetchObject() throws Exception; /*Fetch element of the result set at the current position and returns it as an DDO 28. If repeated, this operation will return the same value.*/ public DDO fetchNext() throws Exception; /*Fetch the next element of the result set and returns it as an DDO 28.*/ public booleanfetchNextN(int how_many, Collection collection) Exception; /*Fetch the next N elements of the result set and insert them into the given collection or dynaset. Returns true if there is at least one data object returned. The number of elements in the returned collection maybe less than how_many if there is not enough memory. In order to process the whole result set, the user is expected to call fetchNextN() repeatedly until it returns false. If how_manyis equal to zero all remaining items are added to the input collection.*/ public DDO findObject(int position, String predicate) Exception; /*Find the data object which satisfies the given predicate, move the cursor to that position, fetch and return the data object. The valid positions for scrollable cursors are: FIRST, LAST, NEXT, and PREVIOUS. These positions are described in setPosition() method. For non-scrollable cursors, only NEXT is valid. The format of predicate string is AttrName RelOp Value where RelOp are relational operators such as=or=,<=, >=, <, >, <>.*/ public void addObject(DDO ddo) throws Exception; /*Adds a new element of the same type, represented by the given DDO 28, to the datastore.*/ public void deleteObject() throws Exception; /*Deletes element at the current position from the datastore.*/ public void updateObject(DDO ddo) throws Exception; /*Updates element at the current position in the datastore, using the given DDO 28. The type of cursor element must match with the type of DDO 28.*/ public DDO newObject() throws Exception; /*Constructs a new element of the same type and returns it as an DDO 28.*/ public void open() throws Exception; /*Open the cursor, and if necessary, execute the query to get the result set. Open reset the position to the beginning.*/ public void close() throws Exception; /*Closes the cursor, and invalidates the result set.*/ public boolean isOpen(); /*Returns true if this cursor is at open state.*/ public void destroy() throws Exception; /*Destroys the resultSetCursor. This method allows for cleanup before the resultSetCursor is garbage collected.*/

10 Schema Mapping

A schema mapping represents a mapping between the schema in a datastore(s) with the structure of the data-object that the user wants to process in memory. Schema mapping has been generally shown in U.S. patent application Nos. 08/276,382 and 08/276,747, also assigned to IBM.

A federated schema is the conceptual schema of a federated datastore 37 which defines a mapping between the concepts in the federated datastore 37 to concepts expressed in each participating datastore schema. In general, a schema mapping handles the difference between how the data are stored in the datastore (as expressed by the datastore's conceptual schema) and how the user wants to process them in the application program. This mapping can also be extended to incorporate relationship associations among entities in a federated datastore, e.g., associating an employee's name with the appropriate department name. Since the mapping process can be a bit tedious, it is usually done with the help of a typical GUI-oriented schema mapping program.

11 Federated datastore mapping components

In addition to schema-mapping information involving the mapping of entities and attributes, a federated datastore 37 must also have access to the following information:

User-id and password mapping. To support single sign-on features, each user-id in the federated datastore 37 needs to be mapped to its corresponding user-ids in the native datastores.

Datastore registration. Each native datastore needs to be registered so it can be located and logged-on to by the federated datastore 37 processes on behalf of its users.

12 Schema Mapping Classes

The mapping information is represented in memory in the form of schema mapping classes. The public interface for these classes are given below.

---
SMException.java
---

```
package COM.ibm.mm.sdk.common;
public Class SMException extends Exception
{
    public SMException( );
    public SMException(String message);
    public SMException(String message, int errorId);
    public SMException(String message, int errorId, int errorcode);
    public SMException(String message, int errorId,
                                    String errorState, int errorcode);
    public SMException(String message, int errorId,
                                    String datastoreName);
    public String name( );
    public short exceptionId( );
    public String datastoreName( );
}
```

---
SchemaMapping.java
---

```
package COM.ibm.mm.sdk.common;
public Class SchemaMapping
{
    // constructors
    public SchemaMapping( );
    public SchemaMapping(String name);
    // information functions
    public String SchemaMappingName( );
    public java.util.Date getDate( );
    public int numberOfDatastore( );
    public int numberOfClass( );
    public void setSchemaMappingName(String name);
    // navigation functions
    public SMDatastore datastore(int dsid);
    public SMDatastore firstDatastore( );
    public SMDatastore nextDatastore( );
    public SMClass class(int classid);
    public SMClass firstClass( );
    public SMClass nextClass( );
    public SMAttr attr(int classid, int attrid);
    public SMClassMapping classMapping(int dsid, int classid);
    public SMAttrMapping attrMapping(int dsid, int classid, int attrid);
    // creation functions
    public int createDatastore( );
    public int createDatastore(String name);
    public int createClass( );
```

---
-continued
---
---
SchemaMapping.java
---

```
    public int createClass(String name);
    public int createAttr(int classid);
    public int createAttr(int classid, String name);
    public SMClassMapping createClassMapping(int dsid, int classid);
    public SMAttrMapping createAttrMapping(int dsid, int classid, int attrid);
    // deletion functions
    public void deleteDatastore(int dsid);
    public void deleteDatastore(String name);
    public void deleteClass(int classid);
    public void deleteClass(String name);
    public void deleteAttr(int classid, int attrid);
    public void deleteAttr(int classid, String name);
    public void deleteClassMapping(int dsid, int classid);
    public void deleteAttrMapping(int dsid, int classid, int attrid);
}
```

---
SMDatastore.java
---

```
package COM.ibm.mm.sdk.common;
public Class SMDatastore
{
    // constructors
    public SMDatastore( );
    public SMDatastore(String name);
    // information functions
    public int datastoreId( );
    public String datastoreName( );
    public String loginName( );
    public void setDatastoreName(String name);
    public void setLoginName(String name);
    // navigation functions
    public SMDatastore nextDatastore( );
    public SMClassMapping classMapping(int classid),
    public SMClassMapping firstClassMapping( );
    public SMClassMapping nextClassMapping( );
    public SMAttrMapping attrMapping(int classid, int attrid);
    // creation functions
    public SMClassMapping createClassMapping(int classid);
    public SMAttrMapping createAttrMapping(int classid, int attrid);
    // deletion functions
    public void deleteClassMapping(int classid);
    public void deleteAttrMapping(int classid, int attrid);
}
```

---
SMClass.java
---

```
package COM.ibm.mm.sdk.common;
public Class SMClass
{
    // constructors
    public SMClass( );
    public SMClass(String name);
    // information functions
    public int classId( );
    pubic String className( );
    public int numberOfAttr( );
    public void setClassName(String name);
    // navigation functions
    public SMAttr attr(int attrid);
    public SMAttr firstAttr( );
    public SMAttr nextAttr( );
    public SMClass nextClass( );
    public SMClassMapping classMapping(int dsid);
    public SMAttrMapping attrMapping(int dsid, int attrid);
    // creation functions
    public int createAttr( );
    public int createAttr(String name);
```

-continued

SMClass.java

```
    public SMClassMapping createClassMapping(int dsid);
    public SMAttrMapping createAttrMapping(int dsid, int attrid);
    // deletion functions
    public void deleteAttr(int attrid);
    public void deleteAttr(String name);
    public void deleteClassMapping(int dsid);
    public void deleteAttrMapping(int dsid, int attrid);
}
```

SMAttr.java

```
package COM.ibm.mm.sdk.common;
public Class SMAttr
{
    // constructors
    public SMAttr( );
    public SMAttr(String name);
    public SMAttr(String name, String type);
    // information functions
    public int attrId( );
    public String attrName( );
    public String attrType( );
    public int attrSize( );
    public void setAttrName(String name);
    public void setAttrType(String type);
    public void setAttrSize(int size);
    // navigation functions
    public SMAttr nextAttr( );
    public SMClass class( );
    public SMClassMapping classMapping(int dsid);
    public SMAttrMapping attrMapping(int dsid);
    // creation functions
    public SMAttrMapping createAttrMapping(int dsid);
    // deletion functions
    public void deleteAttrMapping(int dsid);
}
```

SMClassMapping.java

```
package COM.ibm.mm.sdk.common;
public Class SMClassMapping
{
    // constructors
    public SMClassMapping( );
    // navigation functions
    public int classId( );
    pubic String className( );
    public SMAttrMapping attrMapping(int attrid);
    public SMAttrMapping firstAttrMapping( );
    public SMAttrMapping nextAttrMapping( );
    public SMClassMapping nextClassMapping( );
    public SMDatastore datastore( );
    public SMClass class( );
    //creation functions
    public SMAttrMapping createAttrMapping(int attrid);
```

-continued

SMClassMapping.java

```
    // deletion functions
    public void deleteAttrMapping(int attrid);
    // information functions
    public int numberOfEntity( );
    public String firstEntityName( );
    public String nextEntityName( );
    public String entityType( );
    public void setEntity(String name);
    public void setEntity(String name, String type);
    public void resetEntity(String name);
}
```

SMAttrMapping.java

```
package COM.ibm.mm.sdk.common;
public Class SMAttrMapping
{
    // constructors
    public SMAttrMapping( );
    // navigation functions
    public int attrId( );
    pubic String attrName( );
    public SMAttrMapping nextAttrMapping( );
    public SMClassMapping classMapping( );
    public SMAttr attr( );
    // information functions
    public int numberOfItem( );
    public String entityName( );
    public String entityType( );
    public String firstItemName( );
    public String nextItemName( );
    public String itemType( );
    public int itemSize( );
    public String function( );
    public void setEntity(String name);
    public void setEntity(String name, String type);
    public void setItem(String name);
    public void setItem(String name, String type);
    public void setItem(String name, String type, int size);
    public void setItem(String entityname, String name, String type);
    public void setItem(String entityname, String name, String type, int size) ;
    public void setFunction(String function);
    public void resetEntity(String name);
    public void resetItem(String name);
}
```

13 Persistency support

For many reasons, the internal representation of the schema-mapping, in form of the above mapping classes, should be made persistent. The persistent form of the schema-mapping definition is expressed in a schema Mapping Definition Language (mDL). A mapping generator transforms the mapping internal class representation into an mDL syntax which can be saved in a file or database. A corresponding mapping parser restores the mapping classes internal form from a given mDL file. The syntax of mDL is described informally as follows:

schema Mapping Definition Language (mDL)

```
Schema_Mapping <sm_name>  (
    Datastore  <ds-name1>  ( type   <ds_type>,
                             name   <ds_name>,
                             host   <host_name>,
                             port   <port#>,
```

<table>
<tr><td colspan="4">schema Mapping Definition Language (mDL)</td></tr>
<tr><td colspan="4">
<pre>
                    id       <admin_id>,
                    pwd      <"admin_wd">
                ),
        <ds_name2> ( ... )
Datastore  <ds_name3> ( ... );
Entity <entity_name1> (
    Attribute    <attr_name1>    ( type     <attr_type>,
                                   size     <attr_size>,
                                   id       <attr_id>,
                                   prec     <attr_rec>,
                                   scale    <attr_scale>,
                                   nullable
                                 ),
                 <attr_name2> ( ... );
    Attribute    <attr_name3> ( ... );
    Attribute_Mapping <attr_name1>  ( datastore      <native_dsname>,
                                      nativeEntity   <n_entity_name>,
                                      nAttr          <n_attr_name>,
                                      nSize          <native_size>,
                                      nId            <native_id>,
                                      nPrec          <native_precision>,
                                      nScale         <native_scale>,
                                      nullable,
                                      toNative       <to_fcn_name>,
                                      fromNative     <from_fcn_name>
                                    );
            (<attr_name2>,<attr_name3>) ( ... );   // for m-1, or m-m mapping
                                     ),            // end-of entity_name1 description
        <entity_name2> ( ... );
    Entity  <entity_name3> ( ... );
); // end of sm_name description
</pre>
</td></tr>
</table>

The persistent form of the schema-mapping definition can also exist in different forms, not limited to the mDL syntax above. An example of such an alternate form is the tabular-form or .INI form as described informally below:

<table>
<tr><td>schema mapping.INI form</td></tr>
<tr><td>
<pre>
[Schema-Mapping]
Name= ...
[Datastores]
Type= ... ,Name= ... ,Host= ... ,Port#= ... ,Id= ... ,Pwd= ...
Type= ... next datastore
[Entity]
Name= ... first entity
[Attributes]
Name= ... ,Type= ... ,Size= ... ,Id= ... ,Prec= ... ,Scale= ... ,
Nullable
Name= ... next attr
[Attribute-Mapping]
; a1 maps to one or more native attributes, 1-to-1, many DS
Name=a1,Datastore= ... ,nativeEntity= ... ,nAttr= ... ,nSize= ... ,
nId= ... ,nPrec= ... ,nScale= ... ,Nullable,toNative= ... ,
fromNative= ...
Name=a1, ... next native attr
Name=a2, ...
; a3 and a4 maps to one or more native attributes, m-to-1, many DS
Name=(a3, a4), ...
Name=(a3,a4), ... next native attr
[Entity]
Name= ... next entity
</pre>
</td></tr>
</table>

14 Supporting classes
14.1 Constant
Constant provides a mechanism to deal with constant values. All of the global values or package global values will be defined in this interface.
14.2 Handle
This class is a holder for datastore connection handles, for example, DL sessions, Text Search sessions, etc.

<table>
<tr><td>Handle.java</td></tr>
<tr><td>
<pre>
package COM.ibm.mm.sdk.common;
public class Handle
{
    public Handle(Object value, String type) ;
    public Handle(Handle handle) ;
    public Object handle( ) ;
    public String type( ) ;
};
</pre>
</td></tr>
</table>

14.2.1 Methods
Handle—Constructors public Handle(Object value);

public Handle(Handle handle);

/*The input to this class is a pointer to a handle.*/ public Object handle(); /*Returns the handle's value. The caller should know the correct type to cast to.*/

14.3 NVPair

This class holds an arbitrary name and value pair. It is frequently used to pass parameters with varying numbers, names, and types. As the name suggest, NVPair has two parts, name and value. The name is a string name of the object stored in the value part. Whereas the value refers to the named object itself.

<table>
<tr><td>NVPair.java</td></tr>
<tr><td>
<pre>
package COM.ibm.mm.sdk.common;
public class NVPair
{
    public NVPair(String name, Object value) ;
</pre>
</td></tr>
</table>

-continued

```
NVPair.java public String getName( );
    public void setName(String name);
    public Object getValue( );
    public void setValue(Object value);
    public void set(String name, Object value);
}
```

14.3.1 Methods public NVPair(String name, Object value); /*Construct an NVPair using the given name and value.*/ public String getName(); /*Returns the name assigned to the object in this NVPair.*/ public void setName(String name); /*Assigns a name for the object in this NVPair.*/ public Object getValue(); /*Returns the object stored in this NVPair.*/ public void setValue(Object value); /*Stores an object inside this NVPair.*/ public void set(String name, Object value); /*Stores an object inside this NVPair, and assigns a name to it.*/

14.4 Date

Date is a class which holds a date data type. When represented as a string, the default format of Date is yyyy—mm—dd, as required by the majority of datastores. DDO 28 supports Date objects, that is, it can send an attribute with Date type in and out of a datastore object.

```
Date.java package COM.ibm.mm.sdk.common;
public class Date
{
    public Date(int year, int month, int day);
    public Date(long date);
    public void setTime(long date);
    public static Date valueOf(String s);
    public String toString( );
    public int getYear( );
    public int getMonth( );
    public int getDate( );
};
```

14.4.1 Methods
Date—Constructors public Date(intyear, int month, int day);

public Date(long date);

year is an integer offset from 1990. The valid range for month is between 0 and 11, where 0 represents January. day is the day of the month, an integer between 1 and 31. The second constructor takes a long integer which value is the number of milliseconds since Jan. 1, 1970, 00:00:00 GMT.

public void setTime(long date); /*Sets the date to the number of milliseconds since Jan. 1, 1970, 00:00:00 GMT.*/ public static Date valueOf(String s); /*Create a Date object using a the string value of a given date in yyyy—mm—dd format.*/ public String toString(); /*Gets the string representation of this date. The default format is yyyy—mm—dd, as required by the majority of datastores.*/ public intgetYear(); /*Returns the value of the year in this date, which is an integer offset from 1990.*/ public int getMonth(); /*Returns the value of the month in this date. It is an integer between 0 and 11, where 0 represents January.*/ public int getDate(); /*Returns the day of the month in this date. It is an integer between 1 and 31.*/

14.5 Time

Time is a class to hold time data type. When represented as a string, the default format of Time is hh.mm.ss, as required by the majority of datastores. DDO 28 supports Time objects, that is, it can send an attribute with Time type in and out of datastore.

```
Time.java package COM.ibm.mtn.sdk.common;
public class Time
{
    public Time(int hour, int minute, int second);
    public Time(long time);
    public static Time valueOf(String s);
    public String toString( );
    public int getHours( );
    public int getMinutes( );
    public int getSeconds( );
};
```

14.5.1 Methods
Time—Constructors public Time(int hour, int minute, int second);

public Time(long time);

hour ranges from 0 to 23, minutes is between 0 and 59, second also between 0 and 59.

The second constructor takes a long integer which value is the number of milliseconds since Jan. 1, 1970, 00:00:00 GMT.

public static Time valueOf(String s); /*Create a Time object using a string value of a given time in hh.mm.ss format.*/ public String toString(); /*Gets the string representation of this time. The default format is hh.mm.ss, as required by the majority of datastores.*/ public int getHours(); *Returns the value of the hour in this time. The value is between 0 and 23.*/ public int getMinutes(); /*Returns the value of the minutes after the hour in this time. It is an integer between 0 and 59.*/ public int getSeconds(); /*Returns the value of the seconds after the minute in this time. It is an integer between 0 and 59.*/

14.6 Timestamp

Timestamp is a class to hold timestamp data type. When represented as a string, the default format of Timestamp is yyyy—mo—dd—hh.mi.ss.nnnnnn, as required by the majority of datastores. nnnnnn is the nanosecond fraction of the time. DDO 28 supports Timestamp objects, that is, it can send an attribute with Timestamp type in and out of a datastore.

```
Timestamp.java package COM.ibm.mm.sdk.common;
public class Timestamp
{
    public Timestamp(int year, int month, int day,
```

Timestamp.java -continued

```
            int hour, int minute, int second, int nanoSec) ;
    public Timestamp(long timestamp) ;
    public static Timestamp valueOf(String s) ;
    public String toString( ) ;
    public int getYear( ) ;
    public int getMonth( ) ;
    public int getDate( ) ;
    public int getHours( ) ;
    public int getMinutes( ) ;
    public int getSeconds( ) ;
    public int getNanos( ) ;
    public void setNanos(int nano) ;
    public boolean equals(Timestamp ts) ;
    public boolean before(Timestamp ts) ;
    public boolean after(Timestamp ts) ;
};
```

14.6.1 Methods

Timestamp—Constructors public Timestamp(int year, int month, int day, int hour, int minute, int second, int nanoSec);

public Timestamp(long timestamp);

year is an integer offset from 1990. The valid range for month is between 0 and 11, where 0 represents January. day is the day of the month, an integer between 1 and 31. hour ranges from 0 to 23, minutes is between 0 and 59, second also between 0 and 59. nnnnnn is the nanosecond fraction of the time.

The second constructor takes a long integer which value is the number of milliseconds since Jan. 1, 1970, 00:00:00 GMT.

public static Timestamp valueOf(String s); /*Create a Timestamp object using a the string value of a given time in yyyy—mo—dd—hh.mi.ss.nnnnnn format.*/ public String toString(); /*Gets the string representation of this timestamp. The default format is yyyy—mo—dd—hh.mm.ss.nnnnnn, as required by the majority of datastores.*/ public int getYear(); /*Returns the value of the year in this timestamp, which is an integer offset from 1990.*/ public int getMonth(); /*Returns the value of the month in this timestamp. It is an integer between 0 and 11, where 0 represents January.*/ public int getDate(); /*Returns the day of the month in this timestamp. It is an integer between 1 and 31.*/ public int getHours(); /*Returns the value of the hour in this timestamp. The value is between 0 and 23.*/ public int getMinutes(); /*Returns the value of the minutes after the hour in this timestamp. It is an integer between 0 and 59.*/ public int getSeconds(); /*Returns the value of the seconds after the minute in this timestamp. It is an integer between 0 and 59.*/ public int getNanos(); /*Returns the nanosecond fraction of time in this timestamp.*/ public void setNanos(int nano); /*Sets the nanosecond fraction of time in this timestamp.

public boolean equals(Timestamp ts); /*Returns true if this timestamp equals to ts.

public boolean before(Timestamp ts); /*Returns true if this timestamp is chronologically before timestamp ts.

public boolean after(Timestamp ts); /*Returns true if this timestamp is chronologically after timestamp ts.

14.7 Sort

This is an interface to define a function object containing various functions used in sorting. Such functions are, for example, to extract a key from an object, to compare keys, etc. It is mainly used by the collection class for sorting its members. Sort should be implemented in a subclass to provide a specific sort function. Some examples of existing implementations of sort functions are:

SortString: for sorting a collection of string objects

SortDDOId: for sorting a collection of DDOs 28 based on the item-id

SortDDORank: for sorting a collection of DDOs 28 based on the rank value

SortDDOIdTS: for sorting a collection of DDOs 28 based on the item-id. These DDOs 28 usually are result of a text query.

SortDDOIdPartTS: for sorting a collection of DDOs 28 based on the item-id and part number. These DDOs 28 usually are the result of a text query.

Sort.java

```
package COM.ibm.mm.sdk.common;
public interface Sort
{
    public Object getKey(Object anObject) throws UsageError;
    public int compare(Object first, Object second) throws UsageError;
    public boolean lessThan(Object first, Object second) throws UsageError;
    public boolean greaterThan(Object first, Object second) throws UsageError;
    public boolean equals(Object first, Object second) throws UsageError;
    public void sort(Object[ ] arrayOfObjects, boolean order) throws UsageError;
};
```

14.7.1 Methods public Object getKey(Object anObject) throws UsageError; /*Extract the key of a given object. Returns an object which is the key.*/ public int compare(Object first, Object second) throws UsageError; /*Compares an object with another. Returns an integer number less than zero if the first object is smaller than the second, zero if they are equals, and greater than zero if the first object is greater than the other.*/ public boolean lessThan(Object first, Object second) throws UsageError; /*Compares an object with another. Returns true if the first object is less than the second.*/ public boolean greaterThan(Object first, Object second) throws UsageError; /*Compares an object with another. Returns true if the first object is greater than the second.*/ public boolean equals(Object first, Object second) throws UsageError; /*Compares an object with another. Returns true if the first object is equals to the second.*/ public void sort(Object[] arrayOfObjects, boolean order) throws UsageError; /*Sort an array of objects based on their keys using the above comparison functions. The key is obtained from each object using the getkey() method. The order should be set to true for sort ascending, and false for sort descending. It returns the same array with the objects sorted in the specified order.*/

14.8 QTerm—query term

Query 13 terms are used to represent a predicate logic expression of a query. A basic query term can be as simple as a text-string (as part of a text query) or a pair of attribute name and value separated by a relational operator (=, >, <, >=, <=, !=, BETWEEN, LIKE, IN). Query 13 terms can be combined together with logical operators (AND, OR, NOT).

---

QTerm.java

```
package COM.ibm.mm.sdk.common;
public class Qterm
{
    // for text query
    public QTerm(String textString) ;
    public QTerm(String textString, int textQueryOptions) ;
    // for parametric query
    public QTerm(String attrName, short relOpcode, String attrValue) ;
    public QTerm(String attrName, short relOpcode, String[ ]
                    attrValues) ;
    public QTerm(QTerm leftTerm, short logOPcode, QTerm
                    rightTerm) ;
                    public QTerm left( ) ;
                    public QTerm right( ) ;
                    public QTerm and(QTerm rhs) ;
                    public QTerm or(QTerm rhs) ;
                    public QTerm not( ) ;
    public String   text( ) ;
    public String   name( ) ;
    public short    opcode( ) ;
    public String   value( ) ;
    public int      options( ) ;
    public String   toString( ) ;
};
```

---

14.8.1 Methods

QTerm—constructor public QTerm(String textString);
  public QTerm(String textString, int textQueryOptions);

These are constructors for text query terms. The option is a bit pattern which encodes text query options for this term. For example, whether it is a free-text-search, indispensable condition (the text must exists), not condition (the text must not exists), the text should be given a negative weight, proximity search, etc. Not all text search engines support all of the above options.

public QTerm(String attrName, short relOPcode, String
    attrvalue);

public QTenn(String attrName, short relOPcode, String[]
    attrValues); // for BETWEEN, IN public QTerm(QTerm leftterm, short logOPcode, QTerm
    rightTenn);

These are constructors for parametric query terms. The constructor for a basic query term takes an attribute name, a relational operator code, and the attribute value in string. The second constructor takes two terms and combine them with a logical operator. After the construction, leftTerm and rightTerm are absorbed and owned by the new term and will be deleted when this new term is deleted.

public QTenn left(); /*Returns the left hand side part of this term. The returned term still owned by this object.*/
  public QTerm right(); /*Returns the right hand side part of this term.The returned term still owned by this object.*/
  public QTerm and(QTerm rhs); /*Return a term which is a result of logical 'AND'ing of this term with rhs. Both input terms are absorbed into the resulting term.*/
  public QTerm or(QTerm rhs); /*Return a term which is a result of logical 'OR'ing of this term with rhs. Both input terms are absorbed into the resulting term.*/
  public QTenn not(); /*Return the negation of this term. This term is absorbed into the resulting term.*/
  public String text(); /*Returns the text string part of this term.*/
  public String name(); /*Returns the attribute name in this term.*/
  public short opCode(); /*Returns the operator code in this term.*/
  public String value(); /*Returns the attribute value in this term.*/
  public int options(); /*Returns the option value set in this term.*/
  public String to String(); /*Returns this term in its String form with the correct level of required parenthesis.*/

14.9 QExpr—query expression

A query expression is used to specify a simple query. It is an alternate form of a query string. It has a query term, an option list, and a parameter list. The query term specifies the query condition and the type of the query, for example, it could be a parametric, text, or image query. The option list specifies options relevant to the query. An example of option list in DL could be the maximum result limit of this query, index-class name, etc. The parameter list specifies parameters to be used by or bound to the query.

---

QExpr.java

```
package COM.ibm.mm.sdk.common;
public class Qexpr
{
    public QExpr(NVPair queryTerm, NVPair[ ] optionList,
                    NVPair[ ] paramList) ;
    public QExpr( ) ;
    public String       type( ) ;
    public NVPair       getTerm( ) ;
    public void         setTerm(NVPair termPair) ;
    public int          optionCount( ) ;
    public NVPair       getOption(int position) ;
    public NVPair       getOption(String name) ;
    public void         setOption(int position, NVPair optionPair) ;
    public int          setOption(String name, Object value) ;
    public void         removeOption(int position) ;
    public int          removeOption(String name) ;
    public NVPair[ ]    getOptionList( ) ;
    public void         setOptionList(NVPair[ ] optionList) ;
    public int          parameterCount( ) ;
    public NVPair       getParameter(int position) ;
    public NVPair       getParameter(String name) ;
    public void         setParameter(int position, NVPair parmPair) ;
    public int          setParameter(String name, Object value) ;
    public void         removeParameter(int position) ;
    public int          removeParameter(String name) ;
    public NVPair[ ]    getParameterList( ) ;
    public void         setParameter(NVPair[ ] parameterList) ;
    public String toString( ) ;
};
```

---

14.9.1 Methods

QExpr—constructor public QExpr(NVPair queryTerm, NVPair[] optionList,
    NVPair[] paramList);
  public QExpr();

The first constructor of query expression takes three parameters, a query term, query options, and query parameters. Alternatively, you can create an empty QExpr and set each individual term, options and parameters separately.

public String type(); /*Returns the type of this query expression. The valid type is PARM_QUERY, TEXT_QUERY, or IMAGE_QUERY.*/
  public NVPair getTermo; /*Returns a NVPair containing the term type and QTerm object.*/ public void setTerm(NVPair termpair); /*Set the query term in this expression.*/ public int optionCount(); /*Returns the number of options in this query expression.*/ public NVPair getOption(int position);

public NVPair getOption(String name);

Returns a NVPair containing the option name and value given the option name or position. The first position is 1.

public void setOption(int position, NVPair optionPair);

public int setOption(String name, Object value);

Set the option indicated by its position or its name. The second form returns the position of the option set. If the named option does not exist yet, it will be added.

public void removeOption(int position);

public int removeOption(String name);

Removes the option in the given position. The second form removes the option with the given name, returns its former position.

public NVPair[] getOptionList(); /*Returns an array of NVPair containing the option list.*/ public void setOptionList(NVPair[] optionList); I*Sets the option list of this query expression.*/ public int parameterCount(); /*Returns the number of parameters in this query expression.*/ public NVPair getParameter(int position);

public NVPair getParameter(String name);

Returns a NVPair containing the parameter name and value given the parameter name or position. The first position is 1.

public void setParameter(int position, NVPairparmPair);

public int setParameter(String name, Object value);

Set the parameter indicated by its position or its name. The second form returns the position of the parameter set. If the named parameter does not exist yet, it will be added.

public void removeParameter(int position);

public int removeParameter(String name);

Removes the parameter in the given position. The second form removes the parameter with the given name, returns its fonner position.

public NVPair[] getParameterList(); /*Returns an array of NVPair containing the parameter list.*/ public void setParameterList(NVPair[] parameterList); /*Sets the parameter list of this query expression.*/ public String toString(); /*Returns this expression in its String form with the correct level of required parenthesis.*/

14.10 CQExpr—compound query expression

A compound query expression is used to specify a compound query, that is a query containing a combination of a parametric, text, and image query, joined together using logical operators "AND", "OR", or "NOT". It is also an alternate form of a compound (or federated) query string.

The relationships of QTerm, QExpr, and CQExpr can be summarized using the following EBNF notation:

---

CQExpr = QExpr {logicalOperator QExpr}
    | negation Operator QExpr.
QExpr = QTerm optionList parameterList.
QTerm = QFactor (logicalOperator QFactor}
    | negationOperator QFactor.

---

-continued

---

QFactor = AttributeName relationalOperator Attribute Value
    |AttributeName "BETWEEN" Attribute Value Attribute Value
    |AttributeName "IN"   Attribute Value {Attribute Value}
    |TextQueryString
    |TextQueryString IntegerOptions.
logicalOperator = "AND" | "OR".
negationOperator = "NOT".
relationalOperator = "=" | ">" | "<" | ">=" | "<=" | "!=".
AttributeName = Identifier.
AttributeValue = <a_value>.
TextQueryString = <a_string_value>.
IntegerOptions = <an_integer_value>.
optionList = <list_of_options>.
parameterList = <list_of_parameter>.

---

The construct between "< ... >" is not defined further, since the meaning is clear in the above context. When the above syntax is implemented as classes, it is suffice to combine the representation of QFactor into QTerm, see 14.8 , "QTerm—query term" and 14.9 , "QExpr—query expression".

---

CQExpr.java

```
package COM;ibm.mm.sdk.common;
public class CQExpr
{
    public CQExpr(QExpr qExpr) ;
    public CQExpr(QExpr lhs, short logOPcode, QExpr rhs) ;
    public CQExpr left( ) ;
    public CQExpr right( ) ;
    public CQExpr and(CQExpr rhs) ;
    public CQExpr or(CQExpr rhs) ;
    public CQExpr not( ) ;
public short   opCode( ) ;
public String  toString( ) ;
};
```

---

14.11 Methods

CQExpr—constructor public CQExpr(QExpr qExpr);

public CQExpr(QExpr lhs, short logOPcode, QExpr rhs);

The constructors for compound query expression takes a simple query expression or two simple query expressions joined by a logical operator("AND" or "OR"). After the construction, qExpr, or lhs and rhs are absorbed and owned by the new expression and will be deleted when this new expression is deleted.

public CQExpr left(); /*Returns the left hand side part of this expression. The returned expression still owned by this object.*/ public CQExpr right(); /*Returns the right hand side part of this expression. The returned expression still owned by this object.*/ public CQExpr and(CQExpr rhs); /*Returns a compound expression which is a result of logical 'AND'ing of this expression with rhs. Both input expressions are absorbed into the resulting expression.*/ public CQExpr or(CQExpr rhs); /*Returns a compound expression which is a result of logical 'OR'ing of this expression with rhs. Both input expressions are absorbed into the resulting expression.*/ public QTerm not(); /*Return the negation of this expression. This expression is absorbed into the resulting expression.*/ public short opCode(); /*Returns the operator code in this expression.*/ public String toString(); /*Returns this expression in its String form with the correct level of required parenthesis.*/

14.12 AttributeDef

This class records attribute information. The method listEntityAttributes() in datastore classes returns a collection of AttributeDef objects.

---
AttributeDef.java
---
```
package COM.ibm.mm.sdk.common;
public class AttributeDef
{
    public String  datastoreType;   // DL, TS, QBIC, DB2,
                                    //   OnDemand, etc
    public String  attributeOf;     // parent index class name or table
                                    //   name, etc
    public String  name;            // attribute name
    public short   type;            // attribute type
    public int     size;            // (display) size
    public short   id;              // attribute id, column position
                                    //   number
    public boolean nullable;        // true, if this attribute is nullable
    public int     precision;       // precision, if type is decimal
    public int     scale;           // scale, if type is decimal
};
```
---

12 Sample Programs 12.1 Ouervable Collection in DL

The following sample program illustrates how to create a datastore object and logon to it.. It then creates another datastore to get additional services, in this case, a text-search service using a SearcbManager search engine. In the subsequent steps, it creates a parametric query expression and submits it to the datastore to be evaluated. The result is a queryable collection, which in turn, evaluates a text query expression against the contents of the collection resulted from the previous query. The next query to the queryable collection could be of any type, i.e. parametric, text, or image; in this case a text query is given. Finally, it shows how to retrieve the results and display them on screen.

Performance wise, using the evaluate method to execute queries recursively is slower than combining all the queries together and executing it all at once, since the query evaluator can not optimize several separate queries. However, it gives the user the flexibility of executing queries piece by piece and examine the results at each steps.

---
```
// Create Datastore
DatastoreDL dsDL = new DatastoreDL( ) ;
DatastoreTS dsTS = new DatastoreTS( ) ;
// DatastoreQBIC dsQBIC = new DatastoreQBIC( ) ;
// Establish a connection
dsDL.connect("LIBSRVR2", "USERID", "PASSWORD") ;         // Connect to DL
dsTS.connect("TSServer", "TSPort", CTYP_TCPIP) ;         // Connect to TS
// dsQBIC.connect ("QBICServer", "DbName", "CatalogName") ;   // Connect to QBIC
// Create DL query string
// DLSEARCH_date >= "1990" AND DLSEARCH_Date <= "1999" AND
// DLSEARCH_Volume < 50
String pqs =  " SEARCH=(INDEX_CLASS=DLSEARCH_MAGAZINE, " +
                     " COND=((DLSEARCH_Date > 1990) AND " +
                     " (DLSEARCH_Date <= 1999) AND " +
                     " (DLSEARCH_Volume < 50)) ) ; " +
                     " OPTION=(CONTENT=NO; TYPE_QUERY=STATIC; TYPE_FILTER=DOC)";
// Create TS query string
// search for free text "internet system" and must have text "decision"
String tqs =  " SEARCH=(COND=({internet system} AND $P$ decision )) ; " +
                     " OPTION=(INDEX_CLASS=DLSEARCH; MAX_RESULTS=10) ";
// Evaluate parametric query
QueryableCollection qc1 =
          (QueryableCollection) dsDL.evaluate(pqs, PARAMETRIC_QL_TYPE) ;
// Execute text query on the result of the previous query
QueryableCollection qc2 =
          (QueryableCollection) qc1.evaluate (tqs, TEXT_QL_TYPE) ;
// Getting the results
Iterator iter = (Iterator) qc2.createIterator( ) ;
DDO item;
while(iter.more( ) ) {
    item = (DDO) iter.next( ) ;
    if (item) {
           // Retrieve the content
           item.retrieve( ) ;
           system.out.println("ItemId" + item.getPid( ).getId( ) +
           "Title " + item.getDataByName("DLSEARCH_Title") +
           "Rank " + item.getPropertyByName("Rank") ) ;
    }
}
// Clean up
dsDL.disconnect( ) ;              // disconnects from DL, TS, etc . . .
dsTS.disconnect( )
```
---

12.2 Combined Query in DL

In this example, a combined parametric and text query is created and executed together. The result is stored in Results 6, which is a non-queryable collection.

```
// Create Datastore
DatastoreDL dsDL = new DatastoreDL( ) ;
DatastoreTS dsTS = new DatastoreTs( ) ;
//DatastoreQBIC dsQBIC = new DatastoreQBIC( ) ;
// Establish a connection
dsDL.connect("LIBSRVR2" "USERID", "PASSWORD") ;         // Connect to DL
dsTS.connect("TSServer", "TSPort", CTYP_TCPIP) ;        // Connect to TS
//dsQBIC.connect("QBICServer", "DbName", "CatalogName") ;  // Connect to QBIC
// Create DL query expression
// DLSEARCH_date >= "1990" AND DLSEARCH_Date <= "1999" AND
// DLSEARCH_Volume < 50
String pqs =   " SEARCH=(INDEX_CLASS=DLSEARCH_MAGAZINE, " +
               " COND=((DLSEARCH_Date > 1990) AND " +
               " (DLSEARCH_Date <= 1999) AND " +
               " (DLSEARCH_Volume < 50)) ); " +
          " OPTION=(CONTENT=NO;TYPE_QUERY=STATIC;TYPE_FILTER=DOC) ";
// Create TS query expression
// search for free text "internet system" and must have text "decision"
String tqs =   " SEARCH=(COND=({internet system} AND $P$ decision )) ; " +
               " OPTION= (INDEX_CLASS=DLSEARCH; MAX_RESULTS=10) ";
// Create query objects
ParametricQuery  pPQ = dsDL.createQuery(pqs,_PARAMETRIC_QL_TYPE) ;
TextQuery        pTQ = dsTS.createQuery(tqs,_TEXT_QL_TYPE) ;
CombinedQuery    pCQ = dsDL.createQuery(0,_COMBINED_QL_TYPE) ;
NVPair plist[4] = new NVPair[4];
// Set up and execute combined query
plist[0].set(_PARM_QUERY, (Object)pPQ) ;
plist[1].set(_TEXT_QUERY, (Object)pTQ) ;
plist[2].set(_SCOPE, NULL) ; // no scope
plist[3].set(_PARM_END,   NULL) ;
pCQ.execute(plist) ;
// Getting the results
Results result = (Results) pCQuery.getResult( ) ;
Iterator iter = result.createIterator( ) ;
DDO item;
while(iter.more( )) {
    item = (DDO) iter.next( ) ;
    if (item) {
        // Retrieve the content
        item.retrieve( ) ;
        System.out.println("ItemId " + item.getPid( ).getId( ) +
            "Title " + item.getDataByName("DLSEARCH_Title") +
            "Rank " + item.getPropertyByName("Rank") ) ;
    }
}
// Clean up
dsDL.disconnect( ) ;          // disconnects from DL, TS, etc..
dsTS.disconnect( ) ;
```

12.3 Folder processing in DL

This section illustrates the steps to process folders. Given a query's results, the program iterates over the collection members and checks each DDO 28 for its item-type property. If the type of the item is FOLDER, it calls the folder processing routine recursively. Notice that the routine may also check to see if the item is a document, work-basket, or a work-flow, and process it accordingly.

```
public static void main( ) {
    // Create Datastore
    DatastoreDL ds = new DatastoreDL( ) ;
    // Establish a connection
    dsDL.connect("LIBSRVR2", "USERID", "PASSWORD") ;    // Connect to DL
    // Create DL query expression
    // DLSEARCH_date >= "1990" AND DLSEARCH_Date <= "1999" AND
    // DLSEARCH_Volume < 50
```

-continued

```
    String pqs =   " SEARCH=(INDEX_CLASS=DLSEARCH_MAGAZINE, " +
                     " COND=((DLSEARCH_Date > 1990) AND " +
                     " (DLSEARCH_Date <= 1999) AND " +
                     " (DLSEARCH_Volume < 50)) ) ; " +
OPTION=(CONTENT=NO; " TYPE_QUERY=STATIC TYPE_FILTER=FOLDER) ";
    // Create TS query expression
    // search for free text "internet system" and must have text "decision"
    String tqs =   " SEARCH=(COND=({internet system} AND $P$ decision )) ; " +
                   " OPTION=(INDEX_CLASS=DLSEARCH; MAX_RESULTS=10) ";
    // Evaluate parametric query
    QueryableCollection qc1 =
            (QueryableCollection) ds.evaluate(pqs,_PARAMETRIC_QL_TYPE) ;
    // Execute text query on the result of the previous query
    QueryableCollection qc2 =
            (QueryableCollection) qc1.evaluate (tqs,_TEXT_QL_TYPE) ;
    // Getting the results
    processFolder(qc2) ;
    // Clean up
    dsDLK.disconnect( ) ;       // disconnects from
}
// recursive procedure to process folder
public static void    processFolder(Collection coll) {
    Iterator iter = (Iterator) coll.createIterator( ) ;
    DDO item;
    while(iter.more( )) {
            item = (DDO) iter.next( ) ;
            if (item) {
                    // retrieve the content
                    item.retrieve( ) ;
                    switch (item.getPropertyByName ("item-type")) {
                            case DOCUMENT:
                                    System.out.println("ItemId " + item.getPid( ) .getId( ) +
                                            "Title " + item.getDataByName("DLSEARCH_Title") +
                                            "Rank " + item.getPropertyByName("Rank")) ;
                                    break;
                            case FOLDER:
                                    Collection folder =
                                            (Collection) item.getDataByName("Folder") ;
                                    if (folder != null)
                                            processFolder(folder) ;
                                    break;
                    }
            }
    }
}
```

Using the tools described herein, the present invention allows an application developer to design very powerfull searches and applications which have the capability to search heterogeneous datastores which contain heterogeneous data types, and effectively manage the results of these searches.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention. For example, the present invention is preferably implemented in an object-oriented language such as the JAVA or C++ language, but is certainly not limited to either of these languages. Rather, the present invention includes any language that can practice the invention as outlined in the appended claims.

In addition, while the preferred embodiment has been described as a development tool for application developers, the present invention can also be implemented as a complete software package, or other product, as long as the concepts defined by the appended claims are implemented.

Finally, while the present invention has been developed to provide capabilities needed for multimedia and digital library facilities, the invention is in no way limited to these types of applications. For example, the ideas outlined in the appended claims can also be practiced in traditional single-media, and business-data environments.

We claim:

1. A method of searching multiple heterogeneous datastores in a computer system using an object-oriented data model, comprising:

defining a federated query object as a logical object of said object-oriented data model, said federated query object having instructions within said object to represent and execute a query across said multiple heterogeneous datastores.

2. A method according to claim 1, wherein said federated query object is operable to delegate query processing tasks to different datastores, at least one of said different datastores performing said query processing tasks using a query language that is different from a query language used by another of said different datastores.

3. A method according to claim 1, further comprising:

representing the results of said query as collection objects in said data model, each collection object corresponding to one of said datastores; and representing said collection objects together as a federated collection object in said data model.

4. A method according to claim 2, further comprising:

defining a second federated query object as a subquery of said federated query object, said second federated query object operable to represent and execute a query received from said federated query object across a subset of said multiple heterogeneous datastores.

5. A method according to claim 2, wherein said federated query object accepts a query in a datastore-neutral query syntax.

6. A method according to claim 2, wherein said federated query object accepts a federated query string in a first syntax and parses said federated query string into a second form that is a datastore neutral representation of said query.

7. A method according to claim 6, wherein said second form is a federated query canonical form.

8. A method according to claim 2, further comprising:
initiating said federated query object with an application program, wherein said federated query object is operable to relieve said application program from delegating said query processing tasks to said different datastores.

9. A method according to claim 2, further comprising:
initiating said federated query object with an application program, wherein said federated query object is operable to combine results of said query from different datastores.

10. A method according to claim 2, wherein said federated query object is operable to delegate query processing tasks to datastores which employ any one of DL, DB2, VI, and OD.

11. A method according to claim 2, wherein said federated query object is operable to delegate query processing tasks for parametric, keyword, and QBIC queries.

12. A method according to claim 1, wherein one of said datastores is searchable by non-text image characteristics.

13. An object-oriented computer software package for use in searching multiple heterogeneous datastores in a computer system using an object-oriented data model, comprising;
a federated query class defining a federated query object of said object-oriented data model, said federated query object comprising data and methods and being having instructions within said object to represent and execute a query across said multiple heterogeneous datastores.

14. An object-oriented computer software package according to claim 13, wherein said federated query object is operable to delegate query processing tasks to different datastores, at least one of said different datastores performing said query processing tasks using a query language that is different from a query language used by another of said different datastores.

15. An object-oriented computer software package according to claim 13, further comprising:
a collection class which defines collection objects in said data model, said collection objects operable to represent the results of said query, each collection object corresponding to one of said datastores; and
a federated collection class which defines a federated collection object in said data model, said federated collection object operable to represent a plurality of said collection objects together.

16. An object-oriented computer software package according to claim 14, wherein said federated query class is operable to define a second federated query object as a subquery of said federated query object, said second federated query object operable to represent and execute a query received from said federated query object across a subset of said multiple heterogeneous datastores.

17. An object-oriented computer software package according to claim 14, wherein said federated query object accepts a query in a datastore-neutral query syntax.

18. An object-oriented computer software package according to claim 14, wherein said federated query object is initiated by an application program, said federated query object being operable to relieve said application program from delegating said query processing tasks to said different datastores.

19. An object-oriented computer software package according to claim 14, wherein said federated query object is initiated by an application program, said federated query object being operable to combine results of said query from different datastores.

20. An object-oriented computer software package according to claim 14, wherein said federated query object is operable to delegate query processing tasks to datastores which employ any one of DL, DB2, VI, and OD.

21. An object-oriented computer software package according to claim 14, wherein said federated query object is operable to delegate query processing tasks for parametric, keyword, and QBIC queries.

22. An object-oriented computer software package according to claim 13, wherein one of said datastores is searchable by non-text image characteristics.

23. A computer system capable of searching multiple heterogeneous datastores comprising:
a memory system storing instructions;
a CPU operable to read said instructions from said memory system, said instructions causing said CPU to define a federated query object as a logical object of said object-oriented data model, said federated query object having instructions within said object which cause said CPU to represent and execute a query across said multiple heterogeneous datastores.

24. A computer system according to claim 23, wherein said federated query object causes said CPU to delegate query processing tasks to different datastores, at least one of said different datastores performing said query processing tasks using a query language that is different from a query language used by another of said different datastores.

25. A computer system according to claim 23, wherein said instructions cause said CPU to represent the results of said query as collection objects in said data model, each collection object corresponding to one of said datastores, and represent said collection objects together as a federated collection object in said data model.

26. A computer system according to claim 24, further comprising:
instructions causing said CPU to define a second federated query object as a subquery of said federated query object, said second federated query object operable to cause said CPU to represent and execute a query received from said federated query object across a subset of said multiple heterogeneous datastores.

27. A computer system according to claim 24, wherein said federated query object enables said CPU to accept a query in a datastore-neutral query syntax.

28. A computer system according to claim 24, wherein said federated query object enables said CPU to accept a federated query string in a first syntax and parse said federated query string into a second form that is a datastore neutral representation of said query.

29. A computer system according to claim 28, wherein said second form is a federated query canonical form.

30. A computer system according to claim 24, wherein said federated query object is initiated by an application program, and said federated query object is operable to relieve said application program from delegating said query processing tasks to said different datastores.

31. A computer system according to claim 24, wherein said federated query object is initiated by an application program, and said federated query object is operable to combine results of said query from different datastores.

32. A computer system according to claim 24, wherein said federated query object is operable to cause said CPU to delegate query processing tasks to datastores which employ any one of DL, DB2, VI, and OD.

33. A computer system according to claim 24, wherein said federated query object is operable to cause said CPU to delegate query processing tasks for parametric, keyword, and QBIC queries.

34. A computer system according to claim 23, wherein one of said datastores is searchable by non-text image characteristics.

* * * * *